United States Patent
Kim et al.

(10) Patent No.: US 10,454,650 B2
(45) Date of Patent: Oct. 22, 2019

(54) METHOD AND APPARATUS FOR TRANSMITTING DATA IN WIRELESS COMMUNICATION SYSTEM

(71) Applicant: LG ELECTRONICS INC., Seoul (KR)

(72) Inventors: Jinmin Kim, Seoul (KR); Jeongki Kim, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 15/563,060

(22) PCT Filed: Feb. 24, 2016

(86) PCT No.: PCT/KR2016/001791
§ 371 (c)(1),
(2) Date: Sep. 29, 2017

(87) PCT Pub. No.: WO2016/159513
PCT Pub. Date: Oct. 6, 2016

(65) Prior Publication Data
US 2018/0343096 A1    Nov. 29, 2018

Related U.S. Application Data

(60) Provisional application No. 62/141,815, filed on Apr. 1, 2015.

(51) Int. Cl.
*H04L 5/00* (2006.01)
*H04L 27/26* (2006.01)
(Continued)

(52) U.S. Cl.
CPC .............. *H04L 5/0055* (2013.01); *H04L 5/00* (2013.01); *H04L 27/0006* (2013.01);
(Continued)

(58) Field of Classification Search
CPC ............................ H04L 5/0055; H04W 16/28; H04W 72/0473; H04W 52/24; H04W 74/0808; H04W 84/12; H04B 7/0452
See application file for complete search history.

(56) References Cited

U.S. PATENT DOCUMENTS

| 2012/0184206 A1 | 7/2012 | Kim et al. |
| 2012/0257574 A1 | 10/2012 | Seok et al. |
| 2013/0017794 A1* | 1/2013 | Kloper ............. H04W 74/0808 455/63.1 |
| 2014/0328270 A1* | 11/2014 | Zhu ..................... H04W 74/002 370/329 |

(Continued)

FOREIGN PATENT DOCUMENTS

| KR | 10-2014-0127807 A | 11/2014 |
| WO | WO 2014/027775 A1 | 2/2014 |
| WO | WO 2014/137172 A1 | 9/2014 |

*Primary Examiner* — Christine Ng
(74) *Attorney, Agent, or Firm* — Birch, Stewart, Kolasch & Birch, LLP

(57) ABSTRACT

Disclosed herein is a method for transmitting data performed by a station (STA) in a Wireless LAN (WLAN) system. The method for transmitting data performed by an STA device according to the present invention includes receiving a signal from a first STA of a first Basic Service Set (BSS); obtaining Endurable Interference Margin (EIM) information and transmission power information of the first STA from the reception signal; obtaining a Predicted Interference Power (PIP) using the transmission power information of the first STA; and comparing the EIM information with the PIP, and controlling a Clear Channel Assessment (CCA) level or a transmission power according to the comparison result.

16 Claims, 18 Drawing Sheets

(51) Int. Cl.
*H04W 52/24* (2009.01)
*H04W 16/28* (2009.01)
*H04W 72/04* (2009.01)
*H04W 74/08* (2009.01)
*H04L 27/00* (2006.01)
*H04W 84/12* (2009.01)
*H04B 7/0452* (2017.01)

(52) U.S. Cl.
CPC ............. *H04L 27/26* (2013.01); *H04W 16/28* (2013.01); *H04W 52/24* (2013.01); *H04W 52/243* (2013.01); *H04W 52/246* (2013.01); *H04W 72/0473* (2013.01); *H04W 74/0808* (2013.01); *H04B 7/0452* (2013.01); *H04L 27/2602* (2013.01); *H04W 84/12* (2013.01)

(56) References Cited

U.S. PATENT DOCUMENTS

| | | | |
|---|---|---|---|
| 2015/0188683 A1* | 7/2015 | Zhang | H04L 1/0007 370/280 |
| 2015/0215927 A1* | 7/2015 | Amirijoo | H04W 16/10 370/329 |
| 2015/0281993 A1* | 10/2015 | Chen | H04W 24/10 370/338 |
| 2015/0382360 A1* | 12/2015 | Huang | H04W 72/082 370/329 |
| 2016/0127909 A1* | 5/2016 | Huang | H04L 5/0062 370/329 |
| 2016/0127948 A1* | 5/2016 | Azizi | H04L 27/2613 370/338 |

* cited by examiner

[Figure 1]
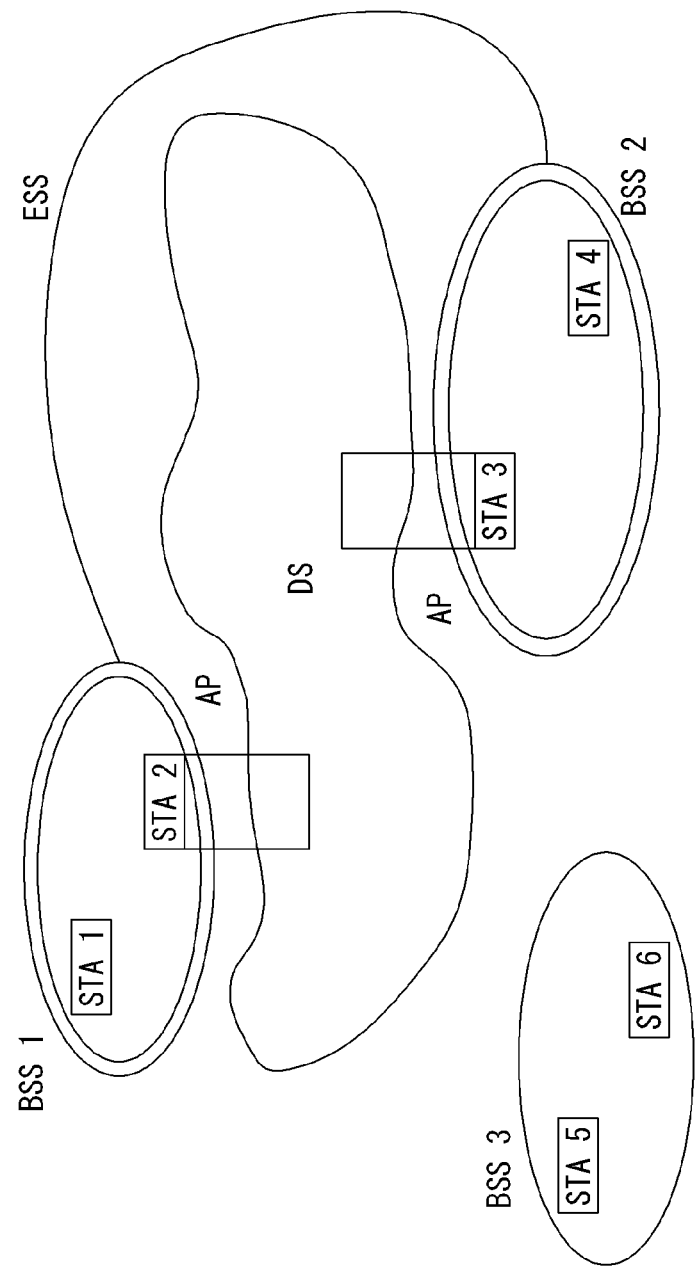

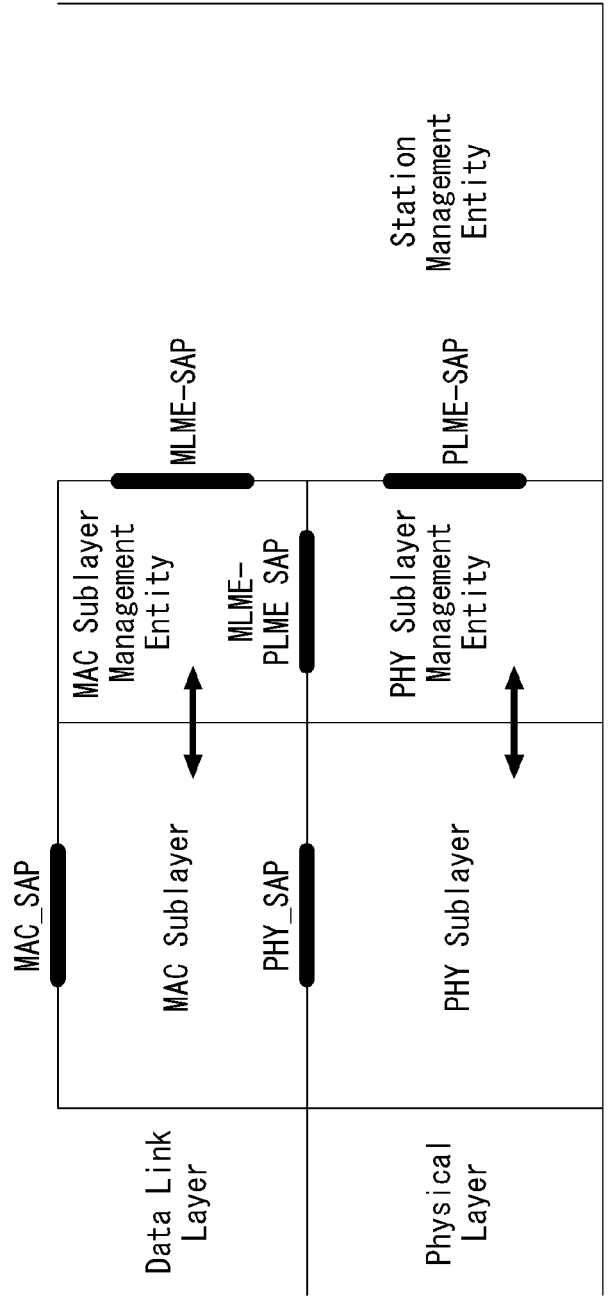
[Figure 2]

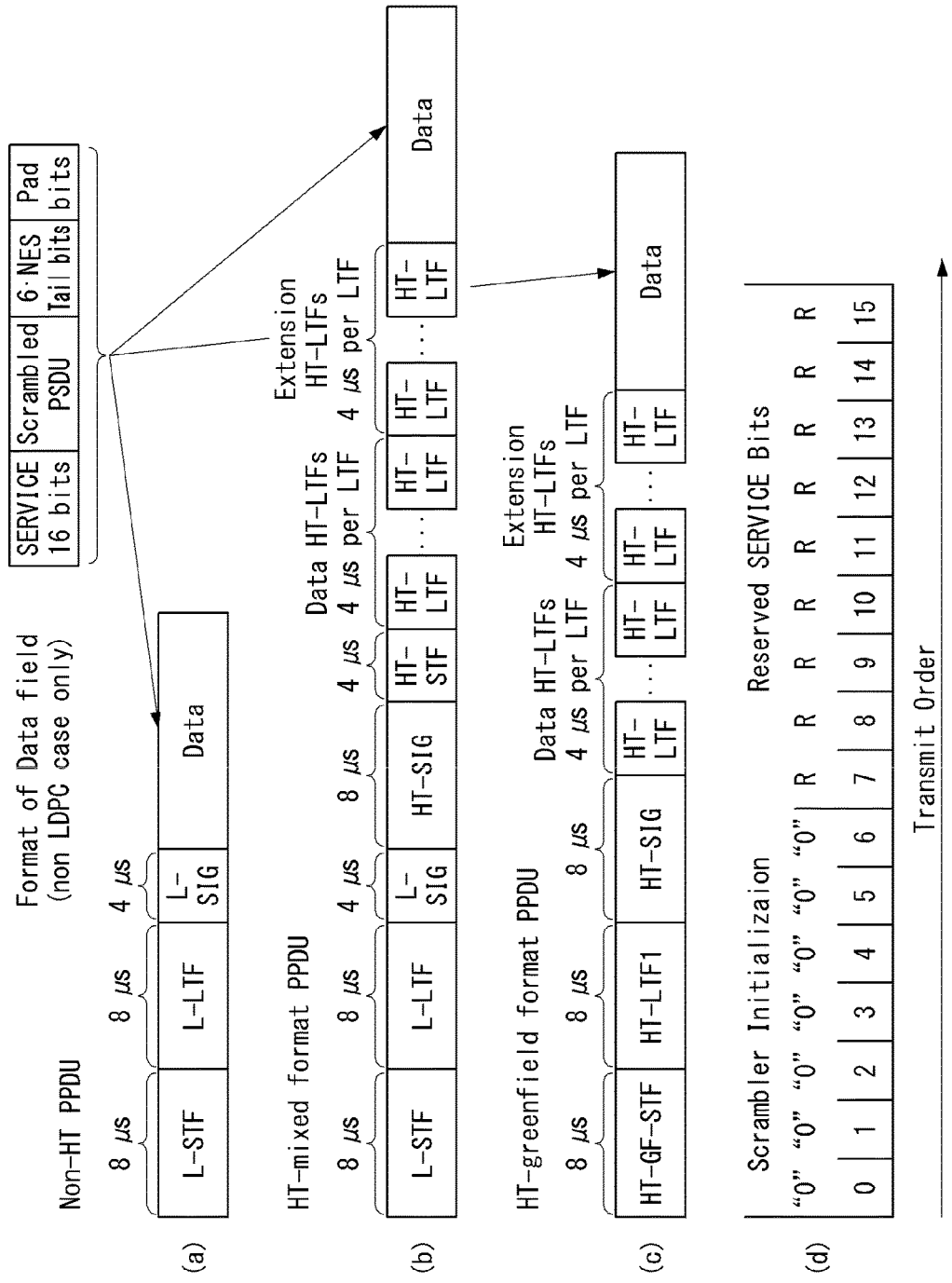

[Figure 4]
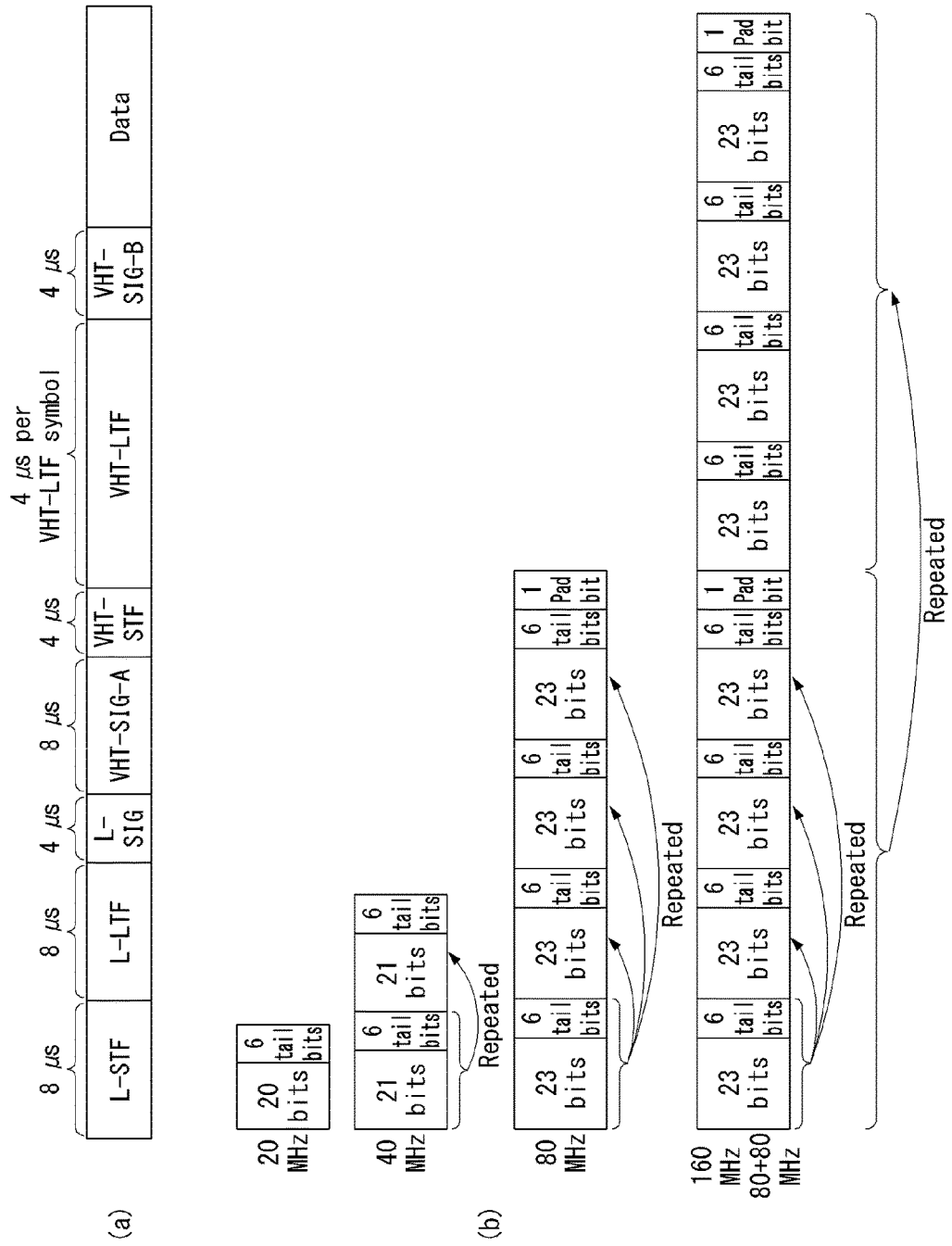

[Figure 5]
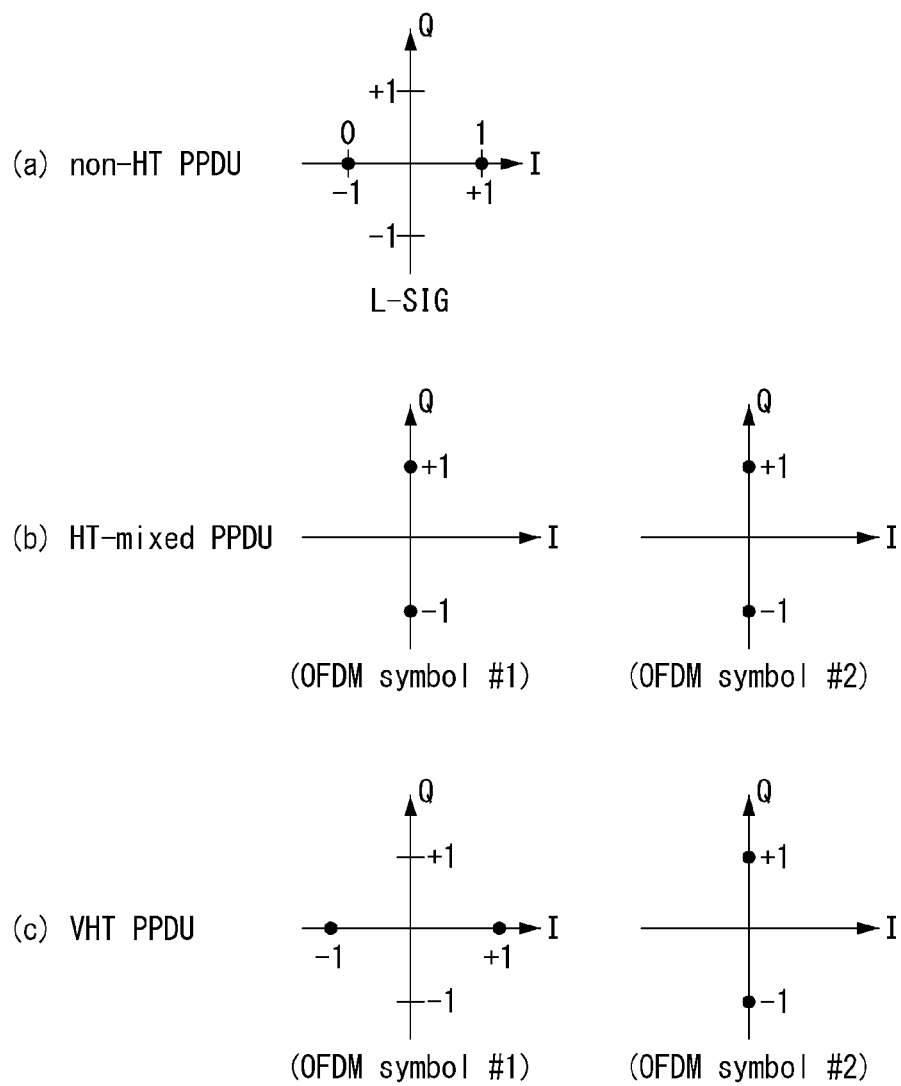

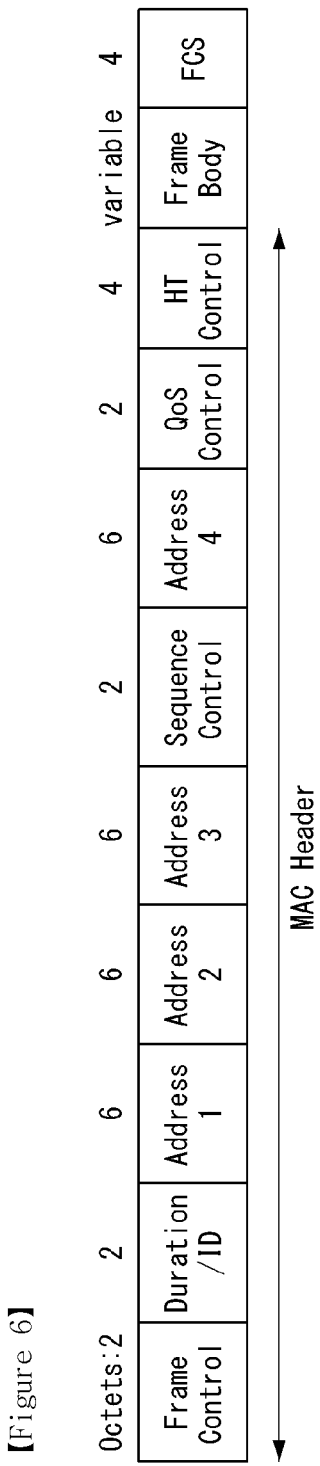
[Figure 6]

[Figure 7]

| Protocol Version | Type | Subtype | To DS | From DS | More Frag-ments | Retry | Power Management | More Data | Protected Frame | Order |
|---|---|---|---|---|---|---|---|---|---|---|
| B0 B1 | B2 B3 | B4 B7 | B8 | B9 | B10 | B11 | B12 | B13 | B14 | B15 |

Bits: 2 2 4 1 1 1 1 1 1 1 1

[Figure 8]
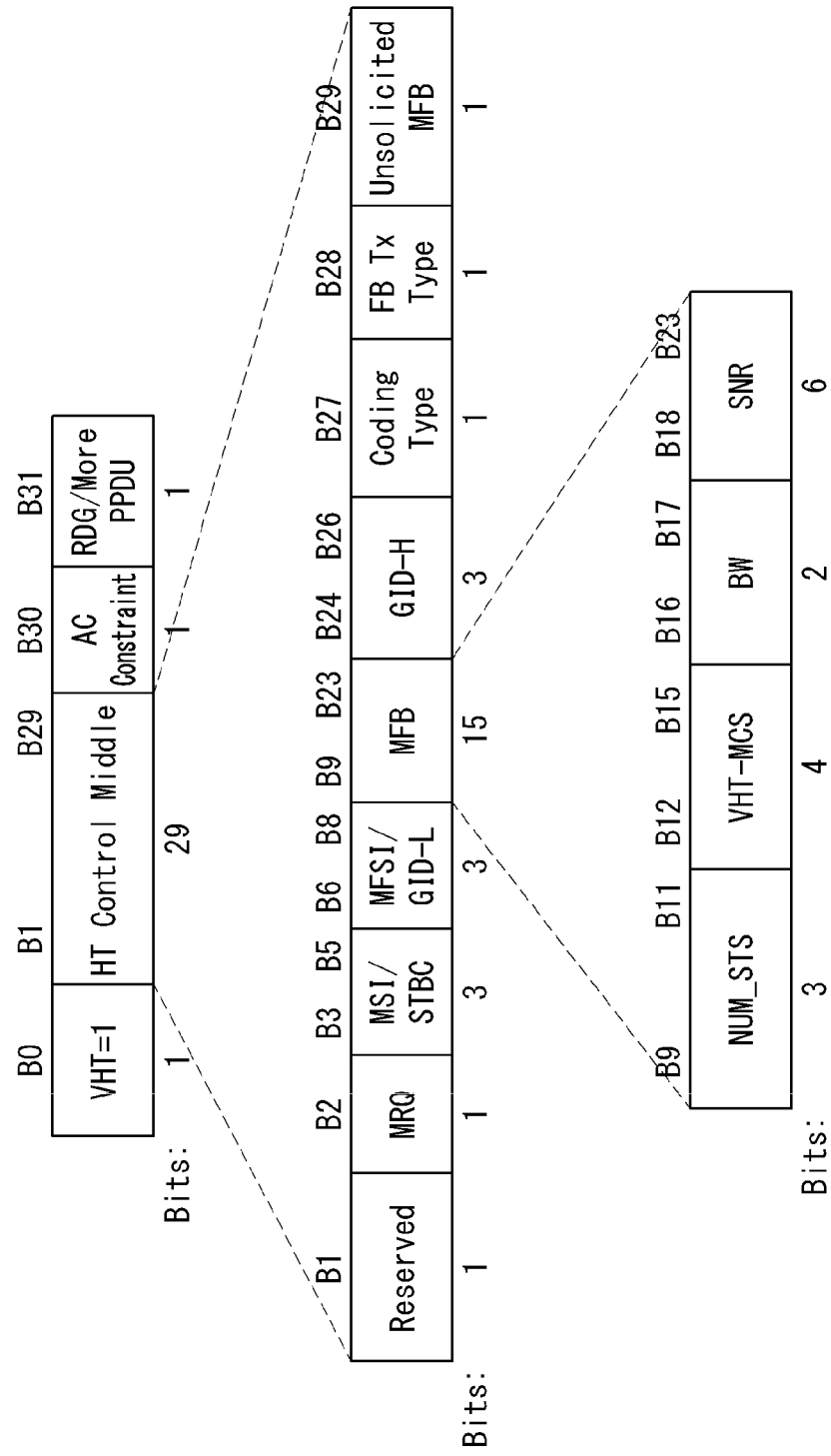

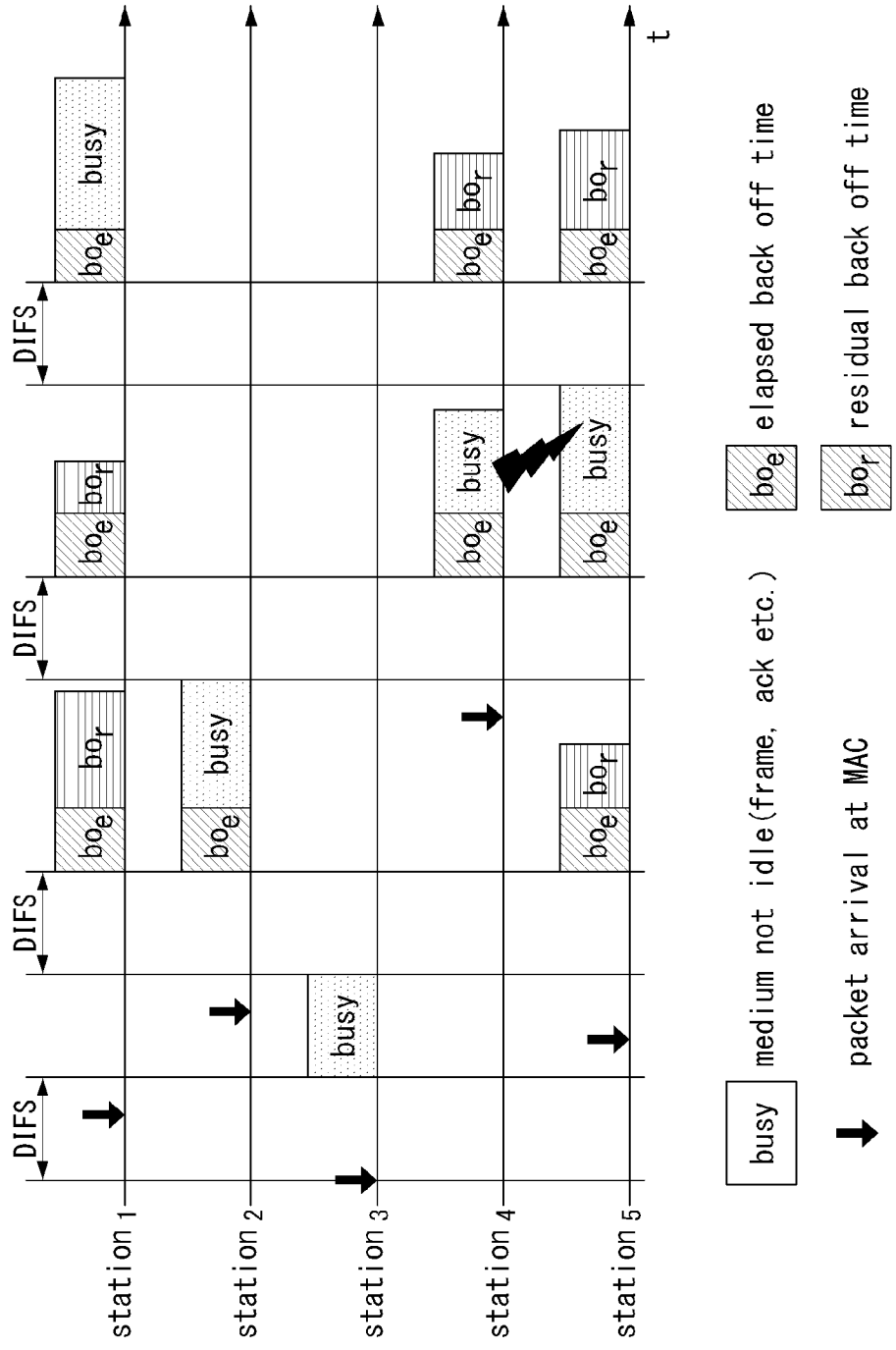
[Figure 9]

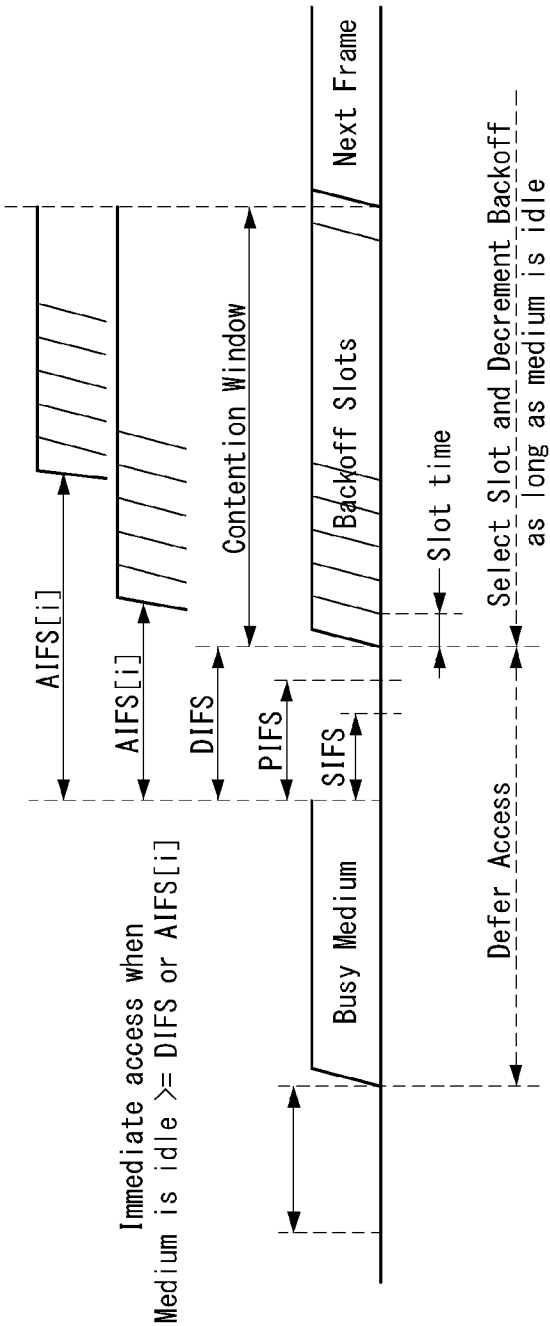
[Figure 10]

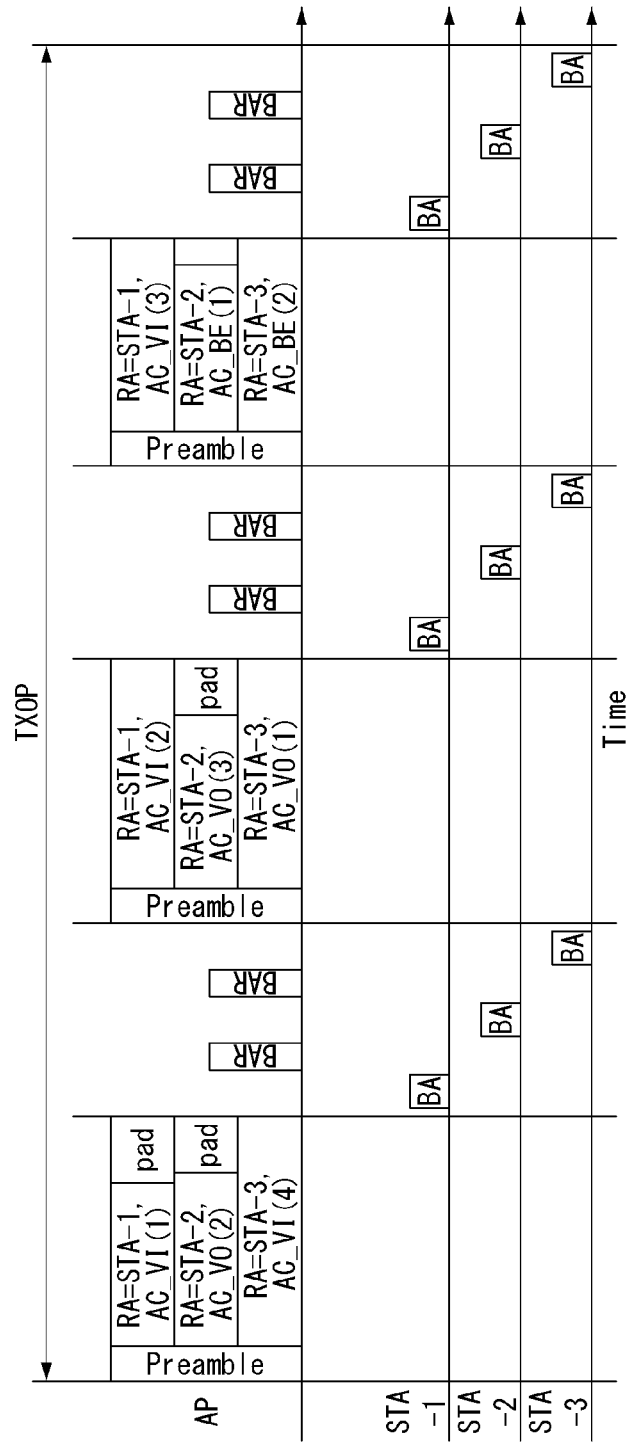

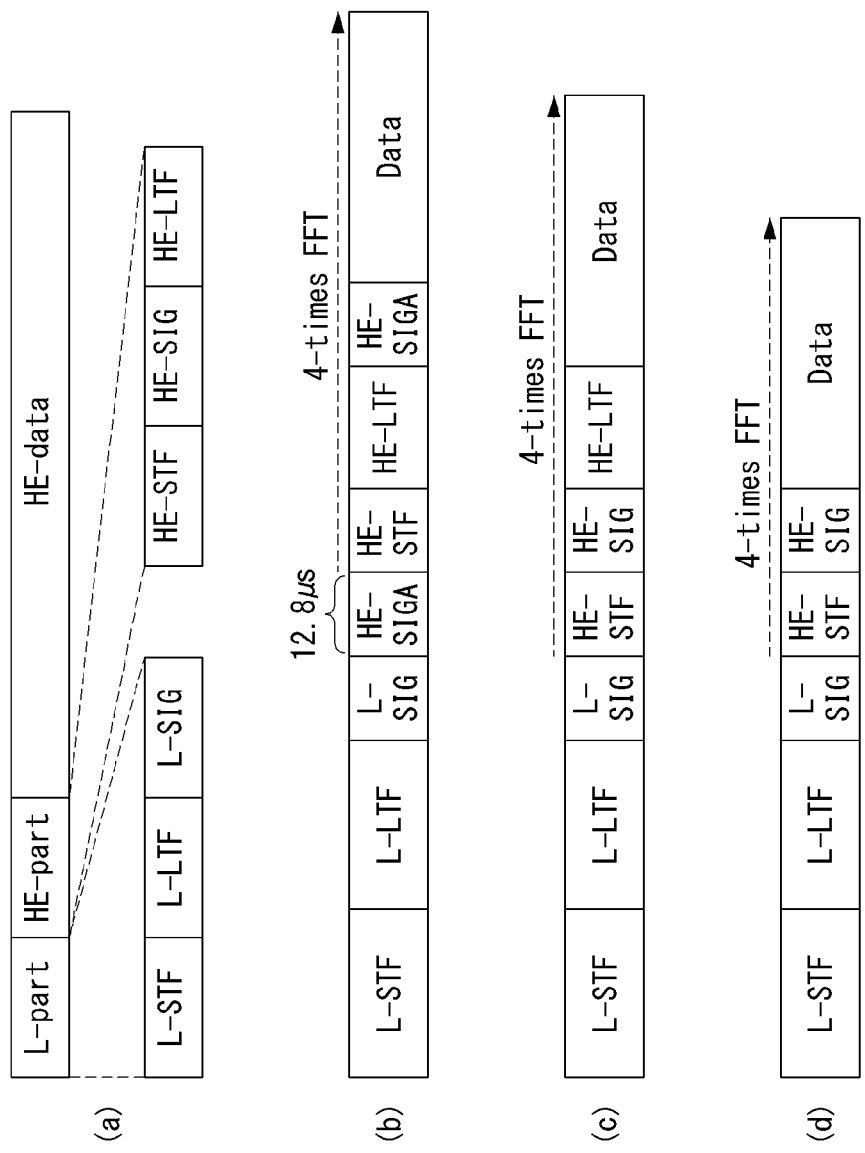

[Figure 13]

| L-STF | L-LTF | L-SIG | HE-SIG A | HE-SIG B | HE-STF | HE-LTF | Data |
|---|---|---|---|---|---|---|---|
| L-STF | L-LTF | L-SIG | HE-SIG A | | | | |
| L-STF | L-LTF | L-SIG | HE-SIG A | | | | |
| L-STF | L-LTF | L-SIG | HE-SIG A | | | | |

[Figure 14]

| L-STF | L-LTF | L-SIG | HE-SIG A | HE-SIG B | HE-STF | HE-LTF | Data for STA1 |
| L-STF | L-LTF | L-SIG | HE-SIG A | | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

[Figure 15]

| L-STF | L-LTF | L-SIG | HE-SIG A | HE-SIG B | HE-STF | HE-LTF | Data for STA1 |
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

【Figure 16】
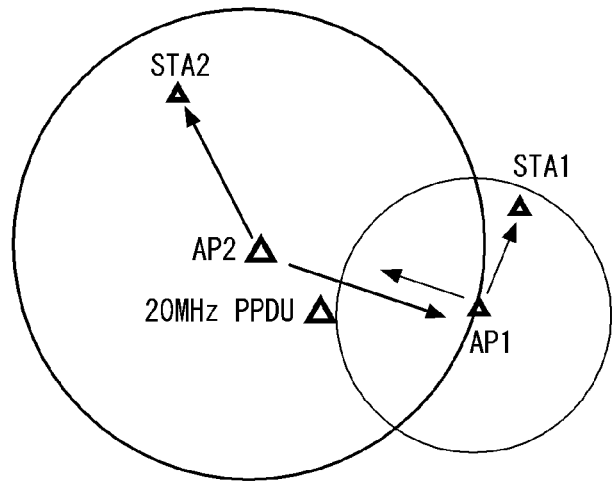
【Figure 17】
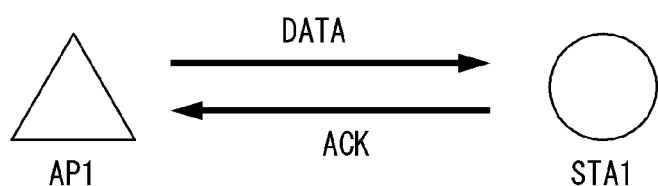

【Figure 18】
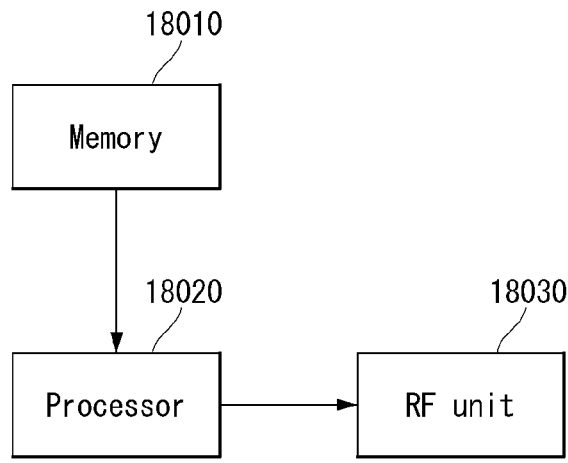
【Figure 19】
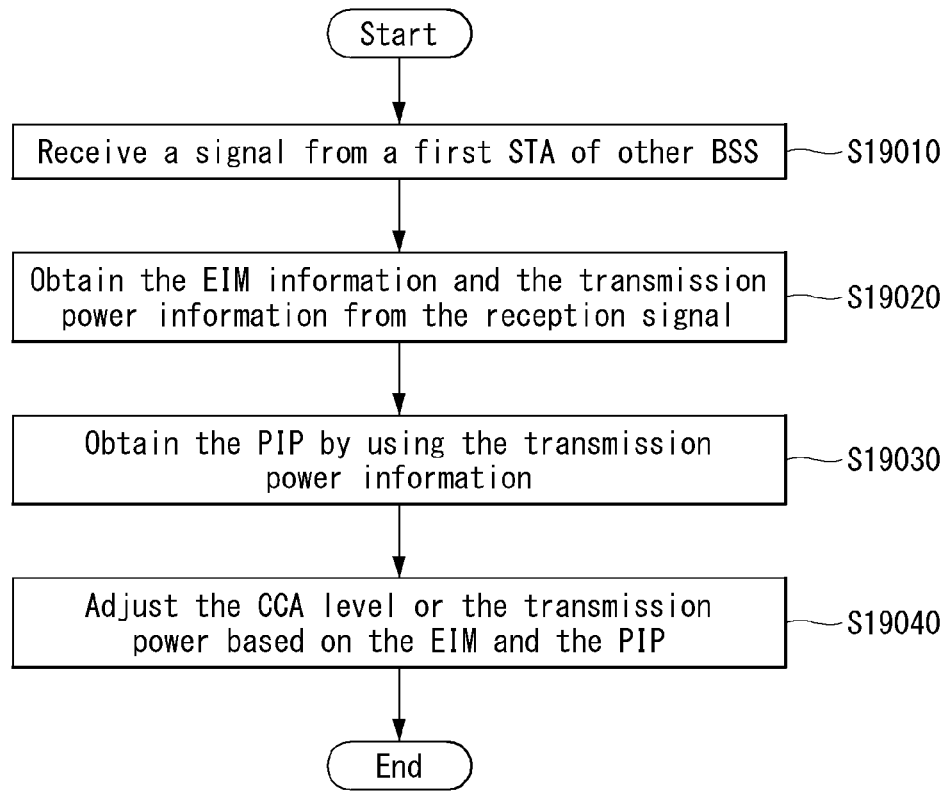

[Figure 20]
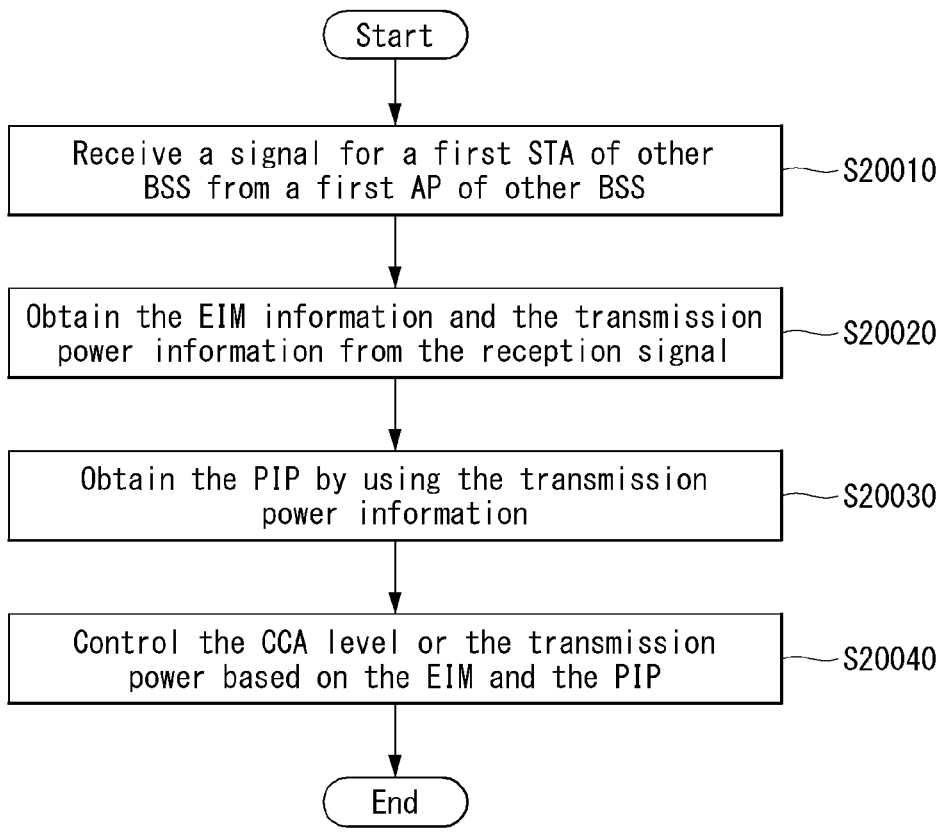

METHOD AND APPARATUS FOR TRANSMITTING DATA IN WIRELESS COMMUNICATION SYSTEM

CROSS REFERENCE TO RELATED APPLICATIONS

This application is the National Phase of PCT International Application No. PCT/KR2016/001791, filed on Feb. 24, 2016, which claims priority under 35 U.S.C. 119(e) to U.S. Provisional Application No. 62/141,815, filed on Apr. 1, 2015, all of which are hereby expressly incorporated by reference into the present application.

TECHNICAL FIELD

The present invention relates to a wireless communication system and, more particularly, to an STA device performing a signal transmission by adjusting a CCA level or a transmission power based on an Endurable Interference Margin (EIM) of a neighboring STA and a Predicted Interference Power (PIP) for a neighboring STA in a Wireless Local Area Network (WLAN) communication system and a method for transmitting data performed by the same.

BACKGROUND ART

Wi-Fi is a wireless local area network (WLAN) technology which enables a device to access the Internet in a frequency band of 2.4 GHz, 5 GHz or 6 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

As described above, new frame formats and numerologies for an 802.11ax system, that is, the next-generation wireless LAN system, are actively discussed.

In the conventional system, a CCA is performed according to the CCA level which is identically configured for each BSS. Accordingly, the spatial bandwidth reuse efficiency between BSSs is very low. This is because a signal transmission is unavailable since it is detected that all channels are occupied even in the case that it is available to transmit simultaneously according to a communication environment, a channel quality, and the like, in the case of the STAs belonged to other BSS.

Accordingly, the present invention is to propose a method for adjusting a CCA level and a method for transmitting data accordingly which may improve the spatial reuse efficiency of bandwidth.

Technical Solution

In order to solve the technical problem, a method for transmitting data performed by a station (STA) in a Wireless LAN (WLAN) system according to an embodiment of the present invention includes receiving a signal for a first STA of a first Basic Service Set (BSS) from a first Access Point (AP) of the first BSS; obtaining Endurable Interference Margin (EIM) information and transmission power information from the reception signal, wherein the EIM information indicates an amount of the interference allowable by the first AP or the first STA, and wherein the transmission power information indicates a transmission power of the first AP; obtaining a Predicted Interference Power (PIP) using the transmission power information, wherein the PIP indicates an amount of interference exerted to the first AP or the first STA when the STA transmits a signal; and controlling a Clear Channel Assessment (CCA) level or a transmission power by comparing the EIM information with the PIP.

In the method for transmitting data performed by an STA according to an embodiment of the present invention, the reception signal may include proximity link information indicating a similarity of interference environment between the first AP and the first STA, and the STA may determine whether to apply the EIM information for the first STA based on the proximity link information.

In the method for transmitting data performed by an STA according to an embodiment of the present invention, the EIM information may include at least one of EIM information for the first AP or EIM information for the first STA.

In the method for transmitting data performed by an STA according to an embodiment of the present invention, the reception signal may include additional restriction information indicating a correction value of the EIM information based on a path-loss between the first AP and the first STA.

In the method for transmitting data performed by an STA according to an embodiment of the present invention, the reception signal may further include beam pattern information applied by the STA when transmitting a signal according to the CCA level adjustment.

In the method for transmitting data performed by an STA according to an embodiment of the present invention, when the reception signal is a signal to which Orthogonal Frequency Division Multiple Access (OFDMA) scheme is applied, the EIM information may indicate a single EIM value with respect to a plurality of STAs or a plurality of sub bandwidths to which a resource unit of the reception signal is allocated or indicates a plurality of EIM values.

In the method for transmitting data performed by an STA according to an embodiment of the present invention, when the reception signal is a signal to which Orthogonal Frequency Division Multiple Access (OFDMA) scheme is applied, the reception signal may include interference sensitivity information with respect to a plurality of sub bandwidths to which a resource unit is allocated.

In the method for transmitting data performed by an STA according to an embodiment of the present invention, the first BSS may be a different BSS from a second BSS to which the STA is belonged, and the first BSS may be an Overlapping Basic Service Set (OBSS) with respect to the second BSS.

In order to solve the technical problem, a station (STA) device of a wireless LAN (WLAN) system according to an embodiment of the present invention includes a radio frequency (RF) unit configured to transmit and receive a radio signal; and a processor configured to control the RF unit, the STA device receives a signal for a first STA of a first Basic Service Set (BSS) from a first Access Point (AP) of the first BSS, obtains Endurable Interference Margin (EIM) information and transmission power information from the reception signal, obtains a Predicted Interference Power (PIP) using the transmission power information, and controls a Clear Channel Assessment (CCA) level or a transmission power by comparing the EIM information with the PIP. The EIM information may indicate an amount of the interference allowable by the first AP or the first STA, and the transmission power information may indicate a transmission power of the first AP, and the PIP may indicate an amount of interference exerted to the first AP or the first STA when the STA transmits a signal.

Technical Effects

According to the present invention, a CCA level may be adjusted depending on the counting number of an ACK frame. Accordingly, even the neighboring STAs are able to perform a signal transmission according to respective channel/transmission and reception power state, thereby the bandwidth use efficiency being increased. In addition, the spatial bandwidth reuse efficiency may be increased between the STAs belonged to the OBSS. Since a CCA level is not adjusted but dynamically performed, it is able to actively and rapidly cope with the state change of STAs and the channel environment change between STAs, thereby the communication performance loss being minimized.

In addition, according to the present invention, a dynamic CCA is performed, and accordingly, the spatial efficiency is increased. In addition, the quality and the margin of a device are considered, which may be a victim in an interference environment, and accordingly, the degradation of system throughput performance may be minimized according to the spatial efficiency increase. In other words, a CCA level is adjusted by considering the interference margin of a neighboring STA, and accordingly, the spatial efficiency may be maximized within a system throughput.

Furthermore, a transmission power is adjusted according to the present invention, and thus, the power consumption of an STA device may be decreased while the interference on a neighboring STA is decreased.

In addition, a dynamic CCA is performed based on the signal transmitted by an AP, not an STA, and accordingly, the present invention may apply a spatial reuse transmission for longer time duration. Accordingly, the frequency use efficiency may be much more increased. Furthermore, for this, an AP transmits information on whether to apply an EIM value with an STA, information in relation to path loss, and the like, and accordingly, the STA of an OBSS may determine whether to perform a dynamic CCA more efficiently. In addition, according to the present invention, when the OFDMA/MIMO is applied, an EIM value is transmitted in a unit of a plurality of resource units or a plurality of sub bandwidths, and thus, a dynamic CCA is performed even in various communication environments, thereby the frequency use efficiency being increased.

DESCRIPTION OF DRAWINGS

FIG. 1 is a diagram showing an example of an IEEE 802.11 system to which an embodiment of the present invention may be applied.

FIG. 2 is a diagram illustrating the structure of layer architecture in an IEEE 802.11 system to which an embodiment of the present invention may be applied.

FIG. 3 illustrates a non-HT format PPDU and HT format PPDU in a wireless communication system to which an embodiment of the present invention may be applied.

FIG. 4 illustrates a VHT format PPDU format in a wireless communication system to which an embodiment of the present invention may be applied.

FIG. 5 is a diagram illustrating a constellation for classifying the formats of PPDUs in a wireless communication system to which an embodiment of the present invention may be applied.

FIG. 6 illustrates the format of a MAC frame of an IEEE 802.11 system to which an embodiment of the present invention may be applied.

FIG. 7 is a diagram illustrating a frame control field within a MAC frame in a wireless communication system to which an embodiment of the present invention may be applied.

FIG. 8 illustrates a VHT format of an HT control field in a wireless communication system to which an embodiment of the present invention may be applied.

FIG. 9 is a diagram for illustrating a random backoff period and a frame transmission procedure in a wireless communication system to which an embodiment of the present invention may be applied.

FIG. 10 is a diagram illustrating an IFS relation in a wireless communication system to which an embodiment of the present invention may be applied.

FIG. 11 is a diagram illustrating a DL MU-MIMO transmission process in a wireless communication system to which an embodiment of the present invention may be applied.

FIG. 12 is a diagram illustrating a high efficiency (HE) format PPDU according to an embodiment of the present invention.

FIG. 13 is a diagram illustrating a HE format PPDU according to an embodiment of the present invention.

FIG. 14 is a diagram illustrating a HE format PPDU according to an embodiment of the present invention.

FIG. 15 is a diagram illustrating a HE format PPDU according to an embodiment of the present invention.

FIG. 16 is a conceptual diagram illustrating a method for performing a CCA according to an embodiment of the present invention.

FIG. 17 illustrates an environment for applying the dynamic CCA according to an embodiment of the present invention.

FIG. 18 shows an STA device according to an embodiment of the present invention.

FIG. 19 shows a method for sending, by a station (STA), data according to an embodiment of the present invention.

FIG. 20 illustrates a data transmission method performed by an STA device according to an additional embodiment of the present invention.

BEST MODE FOR INVENTION

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some cases, in order to avoid making the concept of the present invention vague, the known structure and/or device may be omitted or may be illustrated in the form of a block diagram based on the core function of each structure and/or device.

Furthermore, specific terms used in the following description are provided to help understanding of the present invention, and such specific terms may be changed into other forms without departing from the technological spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.20 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include a MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as a MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching a MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in a MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in a MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU includes a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of four bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU includes a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, L-SIG, and HT-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 20 bits. The 20 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU includes a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmitting STA group in order to support MU-MIMO transmission, and may indicate whether the present MIMO transmission method is MU-MIMO or SU-MIMO.

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 200 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because a MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This is described in more detail below with reference to the following drawings.

FIG. 5 is a diagram illustrating constellations for classifying the formats of PPDUs in a wireless communication system to which an embodiment of the present invention may be applied.

FIG. 5(a) illustrates the constellation of an L-SIG field included in a non-HT format PPDU, FIG. 5(b) illustrates a phase rotation for HT mixed format PPDU detection, and FIG. 5(c) illustrates a phase rotation for VHT format PPDU detection.

In order to classify a non-HT format PPDU, an HT-GF format PPDU, an HT mixed format PPDU, and a VHT format PPDU, an STA uses an L-SIG field and the phase of the constellation of OFDM symbols transmitted after the L-SIG field. That is, the STA may determine a PPDU format based on the L-SIG field of the received PPDU and/or the phase of the constellation of OFDM symbols transmitted after the L-SIG field.

Referring to FIG. 5(a), binary phase shift keying (BPSK) is used as OFDM symbols forming an L-SIG field.

First, in order to determine an HT-GF format PPDU, an STA determines whether a detected SIG field is an L-SIG field when the first SIG field is detected in a received PPDU. That is, the STA attempts decoding based on a constellation, such as the example of FIG. 5(a). When the decoding fails, the STA may determine a corresponding PPDU to be not an HT-GF format PPDU.

Next, in order to determine a non-HT format PPDU, an HT mixed format PPDU, and a VHT format PPDU, the phase of the constellation of OFDM symbols transmitted after the L-SIG field may be used. That is, a method for modulating the OFDM symbols transmitted after the L-SIG field may be different. An STA may determine a PPDU format based on a modulation method for a field after the L-SIG field of the received PPDU.

Referring to FIG. 5(b), in order to determine an HT mixed format PPDU, the phases of two OFDM symbols transmitted after the L-SIG field in the HT mixed format PPDU may be used.

More specifically, the phases of an OFDM symbol #1 and OFDM symbol #2 corresponding to an HT-SIG field transmitted after the L-SIG field in the HT mixed format PPDU are counterclockwise rotated 90 degrees. That is, quadrature binary phase shift keying (QBPSK) is used as a method for modulating the OFDM symbol #1 and the OFDM symbol #2. A QBPSK constellation may be a constellation whose phase has been counterclockwise rotated 90 degrees based on a BPSK constellation.

An STA attempts decoding for a first OFDM symbol and second OFDM symbol corresponding to an HT-SIG-A field transmitted after the L-SIG field of the received PPDU based on a constellation, such as the example of FIG. 5(b). If the decoding is successful, the STA determines that the corresponding PPDU is an HT format PPDU.

Next, in order to determine a non-HT format PPDU and a VHT format PPDU, the phase of the constellation of OFDM symbols transmitted after the L-SIG field may be used.

Referring to FIG. 5(c), in order to determine a VHT format PPDU, the phases of two OFDM symbols transmitted after the L-SIG field in the VHT format PPDU may be used.

More specifically, the phase of an OFDM symbol #1 corresponding to a VHT-SIG-A field after the L-SIG field in the VHT format PPDU is not rotated, but the phase of an OFDM symbol #2 is counterclockwise rotated 90 degrees.

That is, BPSK is used as a modulation method for the OFDM symbol #1, and QBPSK is used as a modulation method for the OFDM symbol #2.

An STA attempts decoding for the first OFDM symbol and second OFDM symbol corresponding to the VHT-SIG field transmitted after the L-SIG field of the received PPDU based on a constellation, such as the example of FIG. 5(c). If the decoding is successful, the STA may determine that the corresponding PPDU is a VHT format PPDU.

In contrast, if the decoding fails, the STA may determine the corresponding PPDU is a non-HT format PPDU.

MAC Frame Format

FIG. 6 illustrates the format of a MAC frame for an IEEE 802.11 system to which an embodiment of the present invention may be applied.

Referring to FIG. 6, the MAC frame (i.e., an MPDU) includes a MAC header, a frame body, and a frame check sequence (FCS).

The MAC Header is defined as an area, including a Frame Control field, a Duration/ID field, an Address 1 field, an Address 2 field, an Address 3 field, a Sequence Control field, an Address 4 field, a QoS Control field, and an HT Control field.

The Frame Control field includes information about the characteristics of a corresponding MAC frame. The Frame Control field is described in detail later.

The Duration/ID field may be implemented to have a different value depending on the type and subtype of a corresponding MAC frame.

If the type and subtype of a corresponding MAC frame is a PS-poll frame for a power save (PS) operation, the Duration/ID field may be configured to include the association identifier (AID) of an STA that has transmitted the frame. In the remaining cases, the Duration/ID field may be configured to have a specific duration value depending on the type and subtype of a corresponding MAC frame. Furthermore, if a frame is an MPDU included in an aggregate-MPDU (A-MPDU) format, the Duration/ID field included in a MAC header may be configured to have the same value.

The Address 1 field to the Address 4 field are used to indicate a BSSID, a source address (SA), a destination address (DA), a transmitting address (TA) indicating the address of a transmitting STA, and a receiving address (RA) indicating the address of a receiving STA.

An Address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The Sequence Control field includes a sequence number and a fragment number. The sequence number may indicate a sequence number assigned to a corresponding MAC frame. The fragment number may indicate the number of each fragment of a corresponding MAC frame.

The QoS Control field includes information related to QoS. The QoS Control field may be included if it indicates a QoS Data frame in a subtype subfield.

The HT Control field includes control information related to an HT and/or VHT transmission/reception scheme. The HT Control field is included in a control wrapper frame. Furthermore, the HT Control field is present in a QoS Data frame having an order subfield value of 1 and a management frame.

The frame body is defined as a MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as a MAC footer and used for the error search of a MAC frame.

The first three fields (i.e., the Frame Control field, the Duration/ID field, and Address 1 field) and the Last field (i.e., the FCS field) form a minimum frame format and are present in all of frames. The remaining fields may be present only in a specific frame type.

FIG. 7 is a diagram illustrating a Frame Control field within the MAC frame in a wireless communication system to which an embodiment of the present invention may be applied.

Referring to FIG. 7, the Frame Control field includes a Protocol Version subfield, a Type subfield, a Subtype subfield, a To DS subfield, a From DS subfield, a More Fragments subfield, a Retry subfield, a Power Management subfield, a More Data subfield, a Protected Frame subfield, and an Order subfield.

The Protocol Version subfield may indicate the version of a WLAN protocol applied to a corresponding MAC frame.

The Type subfield and the Subtype subfield may be set to indicate information that identifies the function of a corresponding MAC frame.

The type of MAC frame may include the three types of management frames, control frames, and data frames.

Furthermore, each of the frame types may be divided into subtypes.

For example, the control frames may include request to send (RTS) frame, a clear-to-send (CTS) frame, an acknowledgment (ACK) frame, a PS-poll frame, a contention free (CF)-end frame, a CF-End+CF-ACK frame, a block ACK request (BAR) frame, a block ACK (BA) frame, a control wrapper (Control+HTcontrol)) frame, a VHT null data packet announcement (NDPA), and a beamforming report poll frame.

The management frames may include a beacon frame, an announcement traffic indication message (ATIM) frame, a disassociation frame, an association request/response frame, a reassociation request/response frame, a probe request/response frame, an authentication frame, a deauthentication frame, an action frame, an action no ACK frame, and a timing advertisement frame.

The To DS subfield and the From DS subfield may include information that is necessary to analyze an Address 1 field to an Address 4 field included in a corresponding MAC frame header. In the case of the control frame, both the To DS subfield and the From DS subfield are set to "0." In the case of the management frame, the To DS subfield and the From DS subfield may be sequentially set to "1" and "0" if a corresponding frame is a QoS management frame (QMF) and may be sequentially set to "0" and "0" if a corresponding frame is not a QMF.

The More Fragments subfield may indicate whether a fragment to be transmitted after a corresponding MAC frame is present or not. The More Fragments subfield may be set to "1" if another fragment of a current MSDU or MMPDU is present and may be set to "0" if another fragment of a current MSDU or MMPDU is not present.

The Retry subfield may indicate whether the transmission of a corresponding MAC frame is based on the retransmission of a previous MAC frame. The Retry subfield may be set to "1" if the transmission of a corresponding MAC frame is based on the retransmission of a previous MAC frame and may be set to "0" if the transmission of a corresponding MAC frame is not based on the retransmission of a previous MAC frame.

The Power Management subfield may indicate power management mode of an STA. The Power Management subfield may indicate that an STA switches to power saving mode if the Power Management subfield value is "1."

The More Data subfield may indicate whether a MAC frame to be additionally transmitted is present or not. The More Data subfield may be set to "1" if a MAC frame to be additionally transmitted is present and may be set to "0" if a MAC frame to be additionally transmitted is not present.

The Protected Frame subfield may indicate whether a Frame Body field has been encrypted. The Protected Frame subfield may be set to "1" if the Frame Body field includes information processed by a cryptographic encapsulation algorithm and may be set to "0" if the Frame Body field does not include information processed by a cryptographic encapsulation algorithm.

The pieces of information included in each of the aforementioned fields may comply with the definition of the IEEE 802.11 system. Furthermore, the aforementioned fields correspond to an example of fields which may be included in a MAC frame, but the present invention is not limited thereto. That is, each of the aforementioned fields may be replaced with another field or an additional field may be further included and all of the fields may not be essentially included.

FIG. 8 illustrates a VHT format of an HT Control field in a wireless communication system to which an embodiment of the present invention may be applied.

Referring to FIG. 8, the HT Control field may include a VHT subfield, an HT control middle subfield, an AC constraint subfield, and a reverse direction grant (RDG)/more PPDU subfield.

The VHT subfield indicates whether the HT Control field has the format of an HT Control field for VHT (VHT=1) or has the format of an HT Control field for HT (VHT=0). In FIG. 8, it is assumed that the HT Control field is an HT Control field for VHT (i.e., VHT=1). The HT Control field for VHT may be called a VHT Control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set to "1" if an RDG is present, and the RDG/more PPDU subfield is set to "0" if an RDG is not present. Assuming that a corresponding field is transmitted by an RD responder, the RDG/more PPDU subfield is set to "1" if a PPDU including the corresponding subfield is the last frame transmitted by the RD responder, and the RDG/more PPDU subfield is set to "0" if another PPDU is transmitted.

As described above, the HT control middle subfield may be implemented to a different format depending on the indication of a VHT subfield.

The HT control middle subfield of an HT Control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in a MAC frame and is not limited thereto. That is, each of the aforementioned fields may be substituted with another field, additional fields may be further included, and all of the fields may not be essentially included.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 9 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . ,).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 9, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 9 shows that the STA 2 has selected the smallest backoff count value and the STA 1 has selected the greatest backoff count value. That is, FIG. 7 illustrates that the remaining backoff time of the STA 5 is shorter than remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 9 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC layer of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the Duration field of the MAC header of a frame, for example.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

Interframe Space (IFS)

A time interval between frames is defined as an interframe space (IFS). An STA may determine whether a channel is used during an IFS time interval through carrier sensing. In an 802.11 WLAN system, a plurality of IFSs is defined in order to provide a priority level by which a wireless medium is occupied.

FIG. 10 is a diagram illustrating an IFS relation in a wireless communication system to which an embodiment of the present invention may be applied.

All of pieces of timing may be determined with reference to physical layer interface primitives, that is, a PHY-TX-END.confirm primitive, a PHYTXSTART.confirm primitive, a PHY-RXSTART.indication primitive, and a PHY-RXEND.indication primitive.

An interframe space (IFS) depending on an IFS type is as follows.

a) A reduced interframe space (IFS) (RIFS)
b) A short interframe space (IFS) (SIFS)
c) A PCF interframe space (IFS) (PIFS)
d) A DCF interframe space (IFS) (DIFS)
e) An arbitration interframe space (IFS) (AIFS)
f) An extended interframe space (IFS) (EIFS)

Different IFSs are determined based on attributes specified by the PHY layer regardless of the bit rate of an STA. IFS timing is defined as a time gap on a medium. IFS timing other than the AIFS is fixed for each physical layer.

The SIFS is used to transmits a PPDU including an ACK frame, a CTS frame, a Block ACK Request (BlockAckReq) frame, or a block ACK (BlockAck) frame, that is, an instant response to an A-MPDU, the second or consecutive MPDU of a fragment burst, and a response from an STA with respect to polling according to a PCF. The SIFS has the highest priority. Furthermore, the SIFS may be used for the point coordinator of frames regardless of the type of frame during a non-contention period (CFP) time. The SIFS indicates the time prior to the start of the first symbol of the preamble of a next frame which is subsequent to the end of the last symbol of a previous frame or from signal extension (if present).

SIFS timing is achieved when the transmission of consecutive frames is started in a Tx SIFS slot boundary.

The SIFS is the shortest in IFS between transmissions from different STAs. The SIFS may be used if an STA occupying a medium needs to maintain the occupation of the medium during the period in which the frame exchange sequence is performed.

Other STAs required to wait so that a medium becomes an idle state for a longer gap can be prevented from attempting to use the medium because the smallest gap between transmissions within a frame exchange sequence is used. Accordingly, priority may be assigned in completing a frame exchange sequence that is in progress.

The PIFS is used to obtain priority in accessing a medium. The PIFS may be used in the following cases.

An STA operating under a PCF
An STA sending a channel switch announcement frame
An STA sending a traffic indication map (TIM) frame
A hybrid coordinator (HC) starting a CFP or transmission opportunity (TXOP)
An HC or non-AP QoS STA, that is, a TXOP holder polled for recovering from the absence of expected reception within a controlled access phase (CAP)
An HT STA using dual CTS protection before sending CTS2
A TXOP holder for continuous transmission after a transmission failure
A reverse direction (RD) initiator for continuous transmission using error recovery
An HT AP during a PSMP sequence in which a power save multi-poll (PSMP) recovery frame is transmitted
An HT AT performing CCA within a secondary channel before sending a 40 MHz mask PPDU using EDCA channel access In the illustrated examples, an STA using the PIFS starts transmission after a carrier sense (CS) mechanism for determining that a medium is an idle state in a Tx PIFS slot boundary other than case where CCA is performed in a secondary channel.

The DIFS may be used by an STA which operates to send a data frame (MPDU) and a MAC management protocol data unit management (MMPDU) frame under the DCF. An STA using the DCF may transmit data in a TxDIFS slot boundary if a medium is determined to be an idle state through a carrier sense (CS) mechanism after an accurately received frame and a backoff time expire. In this case, the accurately received frame means a frame indicating that the PHY-RXEND.indication primitive does not indicate an error and an FCS indicates that the frame is not an error (i.e., error free).

An SIFS time ("aSIFSTime") and a slot time ("aSlotTime") may be determined for each physical layer. The SIFS time has a fixed value, but the slot time may be dynamically changed depending on a change in the wireless delay time "aAirPropagationTime."

Block ACK Procedure

FIG. 11 is a diagram illustrating a DL MU-MIMO transmission process in a wireless communication system to which an embodiment of the present invention may be applied.

In 802.11ac, MU-MIMO is defined in downlink from an AP to a client (i.e., a non-AP STA). In this case, a multi-user (MU) frame is transmitted to multiple recipients at the same time, but acknowledgement (ACK) needs to be individually transmitted in uplink.

All of MPDUs transmitted within a VHT MU PPDU based on 802.11ac are included in an A-MPDU. Accordingly, a response to the A-MPDU within the VHT MU PPDU other than an immediate response to the VHT MU PPDU is transmitted in response to a block ACK request (BAR) frame by the AP.

First, an AP sends a VHT MU PPDU (i.e., a preamble and data) to all of recipients (i.e., an STA 1, an STA 2, and an STA 3). The VHT MU PPDU includes a VHT A-MPDU transmitted to each of the STAs.

The STA 1 that has received the VHT MU PPDU from the AP sends a block acknowledgement (BA) frame to the AP after an SIFS. The BA frame is described later in detail.

The AP that has received the BA from the STA 1 sends a block acknowledgement request (BAR) frame to the STA 2 after an SIFS. The STA 2 sends a BA frame to the AP after an SIFS. The AP that has received the BA frame from the STA 2 sends a BAR frame to the STA 3 after an SIFS. The STA 3 sends a BA frame to the AP after an SIFS.

When such a process is performed by all of the STAs, the AP sends a next MU PPDU to all of the STAs.

High Efficiency (HE, 802.11Ax) System

Hereinafter, a next-generation WLAN system is described. The next-generation WLAN system is a next-generation WI-FI system and, for example, IEEE 802.11ax may be described as an embodiment of such a next-generation WI-FI system. In this specification, the following next-generation WLAN system is called a high efficiency (HE) system, and the frame, PPDU, etc. of the system may be called a HE frame, a HE PPDU, a HE preamble, a HE-SIG field, a HE-STF, a HE-LTF, and so on.

The description for the existing WLAN system, such as the above-described VHT system, can be applied to contents not further described below with respect to the HE system. For example, explanations for the VHT-SIG A field, VHT-STF, VHT-LTF and VHT-SIG-B can be applied for the HE-SIG A field, HE-STF, HE-LTF and HE-SIG-B. The HE frame and the preamble of the proposed HE system can be used for other wireless communication or cellular systems as well. The HE STA may be a non-AP STA or an AP STA as described above. The STA device may also refer to a HE STA device, although it will be referred to as STA in the following specification.

FIG. 12 is a diagram illustrating a high efficiency (HE) format PPDU according to an embodiment of the present invention.

FIG. 12(a) illustrates a schematic configuration of the HE format PPDU, and FIGS. 12(b) to 12(d) illustrate more detailed configurations of the HE format PPDU.

Referring to FIG. 12(a), the HE format PPDU for a HEW may basically include a legacy part (L-part), a HE-part, and a HE-data field.

The L-part includes an L-STF, an L-LTF, and an L-SIG field as in a form maintained in the existing WLAN system. The L-STF, the L-LTF, and the L-SIG field may be called a legacy preamble.

The HE-part is a part newly defined for the 802.11ax standard and may include a HE-STF, a HE-SIG field, and a HE-LTF. In FIG. 12(a), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called a HE-preamble.

Furthermore, the L-part, HE-SIG field and HE-preamble may be collectively called a physical (PHY) preamble/physical preamble.

The HE-SIG field may include information (e.g., OFDMA, UL MU MIMO and/or improved MCS) for decoding the HE-data field.

The L-part and the HE-part may have different Fast Fourier transform (FFT) sizes (i.e., different subcarrier spacing) and use different cyclic prefixes (CPs).

In an 802.11ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, FFT of a 1×, 2×, or 4× size indicates a relative size for a legacy WLAN system (e.g., IEEE 802.11a, 802.11n, and 802.11 ac).

For example, if the sizes of FFT used in the L-part are 64, 128, 256, and 512 in 20 MHz, 40 MHz, 80 MHz, and 200 MHz, respectively, the sizes of FFTs used in the HE-part may be 256, 512, 1024, and 2048 in 20 MHz, 40 MHz, 80 MHz, and 200 MHz, respectively.

When an FFT size becomes larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 200 MHz/512), the subcarrier spacing of the HE-part may be 78.125 kHz (=20 MHz/256, 40 MHz/512, 80 MHz/1024 and/or 200 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 20 μs depending on the GI.

Referring to FIG. 12(b), the HE-SIG field may be divided into a HE-SIG-A field and a HE-SIG-B field.

For example, the HE-part of the HE format PPDU may include a HE-SIG-A field having a length of 12.8 μs, a HE-STF of 1 OFDM symbol, one or more HE-LTFs, and a HE-SIG-B field of 1 OFDM symbol.

Furthermore, in the HE-part, an FFT size four times greater than that of the existing PPDU may be applied from the HE-STF other than the HE-SIG-A field. That is, FFTs having 256, 512, 1024, and 2048 sizes may be applied from the HE-STFs of the HE format PPDUs of 20 MHz, 40 MHz, 80 MHz, and 200 MHz, respectively.

In this case, if the HE-SIG field is divided into the HE-SIG-A field and the HE-SIG-B field as in FIG. 12(b), the positions of the HE-SIG-A field and the HE-SIG-B field may be different from those of FIG. 12(b). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 12(c), the HE-SIG field may not be divided into a HE-SIG-A field and a HE-SIG-B field.

For example, the HE-part of the HE format PPDU may include a HE-STF of 1 OFDM symbol, a HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 200 MHz, respectively.

Referring to FIG. 12(d), the HE-SIG field is not divided into a HE-SIG-A field and a HE-SIG-B field, and the HE-LTF may be omitted.

For example, the HE-part of the HE format PPDU may include a HE-STF of 1 OFDM symbol and a HE-SIG field of 1 OFDM symbol.

In the manner similar to that described above, an FFT size four times larger than that of the existing PPDU may be applied to the HE-part. That is, the FFT sizes of 256, 512, 1024, and 2048 may be applied from the HE-STFs of the HE format PPDU of 20 MHz, 40 MHz, 80 MHz, and 200 MHz, respectively.

The HE format PPDU for a WLAN system according to an embodiment of the present invention may be transmitted through at least one 20 MHz channel. For example, the HE format PPDU may be transmitted in a 40 MHz, 80 MHz or 200 MHz frequency band through a total of four 20 MHz channels. This is described in more detail.

FIG. 13 is a diagram illustrating a HE format PPDU according to an embodiment of the present invention.

FIG. 13 illustrates a PPDU format if an 80 MHz frequency band has been allocated to one STA (or if an OFDMA resource unit has been allocated to a plurality of STAs within an 80 MHz frequency band) or if different streams each having an 80 MHz frequency band have been allocated to a plurality of STAs.

Referring to FIG. 13, an L-STF, an L-LTF, and an L-SIG field may be transmitted in an OFDM symbol generated based on 64 FFT points (or 64 subcarriers) in each 20 MHz channel.

A HE-SIG A field may include common control information in common transmitted to STAs that receive a PPDU. The HE-SIG A field may be transmitted in one to three OFDM symbols. The HE-SIG A field may be duplicated in a 20 MHz unit and includes the same information. Furthermore, the HE-SIG-A field provides notification of information about the full bandwidth of a system.

Information, such as Table 1 below, may be included in the HE-SIG A field.

TABLE 1

| FIELD | BIT | DESCRIPTION |
| --- | --- | --- |
| Bandwidth | 2 | Indicates a bandwidth in which a PPDU is transmitted. For example, 20 MHz, 40 MHz, 80 MHz or 200 MHz |
| Group ID | 6 | Indicates an STA or a group of STAs that will receive a PPDU |
| Stream information | 12 | Indicate the position or number of spatial streams for each STA or indicate the position or number of spatial streams for a group of STAs |
| UL indication | 1 | Indicate whether a PPDU is directed toward an AP (uplink) or an STA (downlink) |
| MU indication | 1 | Indicate whether a PPDU is an SU-MIMO PPDU or an MU-MIMO PPDU |
| GI indication | 1 | Indicate whether a short GI or a long GI is used |
| Allocation information | 12 | Indicate a band or channel (a subchannel index or subband index) allocated to each STA in a band in which a PPDU is transmitted |
| Transmission power | 12 | Indicate transmission power for each channel or each STA |

Pieces of information included in each of the fields illustrated in Table 1 may comply with the definition of the IEEE 802.11 system. Furthermore, each of the aforementioned fields corresponds to an example of fields which may be included in a PPDU, but is not limited thereto. That is, each of the aforementioned fields may be replaced with another field or an additional field may be further included and all of the fields may not be essentially included.

The HE-STF is used to improve performance of automatic gain control (AGC) estimation in MIMO transmission. The HE-STF may be generated using the sequence of a frequency domain for a specific band. A HE-long training field (HE-LTF) is a field which is used to estimate a MIMO channel between reception chains in a receiver and a set of constellation mapper outputs.

The HE-SIG-B field may contain user-specific information required for each STA to receive its data (e.g., PSDU). The HE-SIG-B field may be transmitted in one or two OFDM symbols. For example, the HE-SIG-B field may contain information about the modulation and coding scheme (MCS) of the PSDU and the length of the PSDU.

The L-STF, L-LTF, the L-SIG field, and the HE-SIG A field may be repeated in a 20 MHz channel unit and transmitted. For example, when a PPDU is transmitted through four 20 MHz channels (i.e., 80 MHz bands), the L-STF, the L-LTF, the L-SIG field, and the HE-SIG A field may be repeated every 20 MHz channel and transmitted.

If the size of FFT increases, a legacy STA supporting the existing IEEE 802.11a/g/n/ac may not decode a corresponding HE PPDU. In order for a legacy STA and a HE STA to coexist, the L-STF, L-LTF, and the L-SIG field are transmitted through 64 FFT in a 20 MHz channel so that a legacy STA can receive them. For example, the L-SIG field may occupy one OFDM symbol, and one OFDM symbol time may be 4 µs, and a GI may be 0.8 µs.

The size of FFT for each frequency unit may be further increased from the HE-STF (or the HE-SIG A field). For example, 256 FFT may be used in a 20 MHz channel, 512 FFT may be used in a 40 MHz channel, and 1024 FFT may be used in an 80 MHz channel. If the size of FFT increases, the number of OFDM subcarriers per unit frequency increases because spacing between the OFDM subcarriers is reduced, but the OFDM symbol time/duration is increased. In order to improve efficiency of a system, the length of a GI after the HE-STF may be set to be the same as that of the HE-SIG A field.

The HE-SIG A field may include information which is required for a HE STA to decode a HE PPDU. However, the HE-SIG A field may be transmitted through 64 FFT in a 20 MHz channel so that both a legacy STA and a HE STA can receive the HE-SIG A field. The reason for this is that the HE STA has to receive an existing HTNHT format PPDU in addition to a HE format PPDU and a legacy STA and the HE STA have to distinguish the HTNHT format PPDU from the HE format PPDU.

FIG. 14 is a diagram illustrating a HE format PPDU according to an embodiment of the present invention.

In FIG. 14, it is assumed that 20 MHz channels are allocated to different STAs (e.g., an STA 1, an STA 2, an STA 3, and an STA 4).

Referring to FIG. 14, in this case, the size of FFT per unit frequency may be further increased after a HE-STF (or the HE-SIG B field). For example, 256 FFT may be used in a 20 MHz channel, 512 FFT may be used in a 40 MHz channel, and 1024 FFT may be used in an 80 MHz channel from the HE-STF (or the HE-SIG B field).

Information transmitted in each of the fields included in the HE format PPDU is the same as that of FIG. 13, and a description thereof is omitted.

The HE-SIG B field may include information specified for each of the STAs, but may be encoded in a full band (i.e., indicated in the HE-SIG-A field). That is, the HE-SIG B field includes information about all of the STAs and may be transmitted so that it is received by all of the STAs.

The HE-SIG B field may provide notification of information about a frequency bandwidth allocated to each of the STAs and/or stream information in a corresponding frequency band. For example, in the HE-SIG-B field of FIG. 14, a 20 MHz frequency band may be allocated to the STA 1, a next 20 MHz frequency band may be allocated to the STA 2, a next 20 MHz frequency band may be allocated to the STA 3, and a next 20 MHz frequency band may be allocated to the STA 4. Furthermore, a 40 MHz frequency band may be allocated to the STA 1 and the STA 2, and a next 40 MHz frequency band may be allocated to the STA 3 and the STA 4. In this case, different streams may be allocated to the STA 1 and the STA 2, and different streams may be allocated to the STA 3 and the STA 4.

Furthermore, a HE-SIG-C field may be defined and added to the example of FIG. 14. In this case, in the HE-SIG-B field, information about all of the STAs may be transmitted in a full band, and control information specific to each of the STAs may be transmitted in a 20 MHz unit through the HE-SIG-C field. In this case, the HE-SIG-C field may be transmitted after the HE-LTF field.

Furthermore, in the examples of FIGS. 13 and 14, the HE-SIG-B field is not transmitted in a full band, but may be transmitted in a 20 MHz unit like the HE-SIG-A field. This is described below with reference to related drawings.

FIG. 15 is a diagram illustrating a HE format PPDU according to an embodiment of the present invention.

In FIG. 15, it is assumed that 20 MHz channels are allocated to different STAs (e.g., STA 1, STA 2, STA 3, and STA 4).

Referring to FIG. 15, the HE-SIG-B field is not transmitted over an entire band but transmitted in a unit of 20 MHz, as in the HE-SIG-A field. However, in this case, the HE-SIG-B is encoded in a unit of 20 MHz and transmitted, unlike the HE-SIG-A field, but the HE-SIG-B may not be duplicated in a unit of 20 MHz and transmitted.

In this case, the FFT size per unit frequency may further increase from a HE-STF (or HE-SIG B). For example, from the HE-STF (or the HE-SIG B), 256 FFT may be used in a 20 MHz channel, 512 FFT may be used in a 40 MHz channel, and 1024 FFT may be used in an 80 MHz channel.

Information transmitted from each field included in the PPDU is the same as that of an illustration of FIG. 13, and therefore a description thereof is omitted.

The HE-SIG-Afield is duplicated in a unit of 20 MHz and transmitted.

The HE-SIG B field may provide notification of information about an allocated frequency bandwidth and/or stream information in a corresponding frequency band on a STA basis. The HE-SIG-B field includes information about each STA and information about each STA may be included in each HE-SIG-B field of a 20 MHz unit. In this case, FIG. 15 illustrates a case in which 20 MHz is assigned on each STA basis, but for example, when 40 MHz is assigned to the STA, the HE-SIG-B field may be duplicated and transmitted in a unit of 20 MHz.

In a situation of supporting different bandwidths on each BSS basis, when allocating some bandwidths having a small interference level from an adjacent BSS to the STA, as described above, it may be preferable not to transmit the HE-SIG-B field over an entire band.

In FIGS. 13 to 15, the data field is a payload and may include a service field, a scrambled PSDU, tail bits, and padding bits.

A HE format PPDU of FIGS. 13 to 15 may be classified by s repeated L-SIG (RL-SIG) field, which is a repetition symbol of an L-SIG field. The RL-SIG field is inserted in front of the HE SIG-A field, and each STA may classify a format of the PPDU received using the RL-SIG field as the HE format PPDU.

CCA Performance Method by an HE STA

Hereinafter, a CCA method of an HE STA is described in more detail. As described above, an AP STA and a non-AP STA perform a Clear Channel Assessment (CCA) in order to determine busy/idle state of a channel. The CCA represents logical function/operation of a physical layer in which a current use state of a Wireless Medium (WM) is determined.

An STA performs the CCA in the physical layer, and reports the result to the MAC layer. The STA may perform a CCA-Energy Detection (ED) and a CCA-Carrier sensing (CS) as the CCA of two modes. As an embodiment, the STA may perform either one of the CCA-ED or the CCA-CS, or may determine busy/idle mode of a channel by using a combination of the CCA-CS and the CCA-ED. In the case of using a combination of the CCA-CS and the CCA-ED, the STA may perform the CCA by performing the CCA-CS first, and then performing the CCA-ED additionally, and may also perform the CCA by performing the CCA-ED first, and then performing the CCA-CS additionally.

The CCA-CS is performed through signal detection for a preamble, and a threshold of the CCA-CS is determined based on the minimum modulation and the code rate sensitivity. In addition, the level of the CCA-CS, that is, the threshold value may be set to different values depending on a bandwidth. For example, for the case of 20 MHz channel spacing, when a size of a received preamble signal is −82 dBm or greater, the STA may determine the channel to be busy. For the case of 10 MHz channel spacing, when a size of a received preamble signal is −85 dBm or greater, the STA may determine the channel to be busy. And, for the case of 5 MHz channel spacing, when a size of a received preamble signal is −88 dBm or greater, the STA may determine the channel to be busy. As an embodiment, in the preamble of 802.11a signal, an STA may perform the CCA-CS using correlation of an STF. In the present specification, the CCA threshold value/threshold value in a unit of dBm may be referred to as a CCA level. In the present specification, the CCA-CS may also be referred to as a CCA-Signal Detection (SD).

In the case of the CCA-ED, regardless of the signal defined in the 802.11 system, an STA determines it to be busy when an arbitrary signal is detected with a strength (dBm) of a threshold value or greater. In this case, the threshold may be selected as a value which is higher than the CCA-CS as much as 20 dBm. For example, for the case of 20 MHz channel spacing, when a size of a received preamble signal is −62 dBm or greater, the STA may determine the channel to be busy. For the case of 10 MHz channel spacing, when a size of a received preamble signal is −65 dBm or greater, the STA may determine the channel to be busy. And, for the case of 5 MHz channel spacing, when a size of a received preamble signal is −68 dBm or greater, the STA may determine the channel to be busy.

The method described below may be applied to both of the CCA-CS and the CCA-ED, but in the embodiment below, it is described the case that an STA performs the CCA-CS.

In the case that an STA and a system support wideband such as 20/40/80/200 MHz, different CCA levels may be applied between a primary channel and a non-primary channel. In this case, the CCA level (threshold values) according to on each channel bandwidth may be defined as Table 2.

TABLE 2

| Channel bandwidth | Signal threshold (primary) | Signal threshold (non-primary) | Energy threshold (non-primary) |
| --- | --- | --- | --- |
| 20 MHz | −82 dBm | −72 dBm | −62 dBm |
| 40 MHz | −79 dBm | −72 dBm | −59 dBm |
| 80 MHz | −76 dBm | −69 dBm | −86 dBm |
| 160 MHz | −73 dBm | n/a | n/a |

In Table 2, since there is no secondary channel in the 200 MHz channel, the corresponding signal threshold/energy threshold is not defined.

FIG. 16 is a conceptual diagram illustrating a method for performing a CCA according to an embodiment of the present invention.

As described above, since the CCA level, that is, the CCA threshold is operated with a fixed value in a single BSS for each channel bandwidth, an efficient resource management may be difficult in a space. In FIG. 16 and the following embodiments, AP1 and STA1 may be belonged to a first BSS, and AP2 and STA2 may be belonged to a second BSS.

In the embodiment of FIG. 16, AP2 may transmit a PPDU to STA2 through the 20 MHz channel. In this case, when the signal transmitted by AP2 is received in AP1 with the signal strength of −82 dBm or greater, AP1 determines the channel to be busy and does not transmit the signal to STA1. However, in the case that AP1 and STA1 are far enough away from AP2 and STA2 or in the environment in which the interference on STA2 caused by the signal transmitted by AP1 is not serious, it is more efficient that AP1 transmits a signal to STA1. That is, by using a fixed CCA level, the resource use efficiency in a space becomes decreased. Particularly, this may be problematic in the case that the BSS to which AP1 and STA1 are belonged is different from the BSS to which AP2 and STA2 are belonged, particularly, in the case that two BSSs are the OBSS.

Accordingly, hereinafter, in order to improve the spatial efficiency, a method is proposed and described that a CCA level is dynamically adjusted depending on an STA, and a signal is transmitted by determining busy/idle state of the signal based on the adjusted CCA level. Hereinafter, as a method for an STA to dynamically adjust a CCA level, a standard of evaluating and adjusting the CCA level, and a method for managing the CCA level are described in more detail. Hereinafter, the dynamic CCA is referred to as adjusting a CCA level based on a specific reference instead of using a fixed CCA level, and performing a CCA according to the adjusted CCA level.

In the embodiment below, the CCA level adjustment may be applied to the STAs belonged to different BSSs. Particularly, the CCA level adjustment may be used to increase the spatial reuse efficiency of a bandwidth among STAs in the OBSS.

FIG. 17 illustrates an environment for applying the dynamic CCA according to an embodiment of the present invention.

FIG. 17 shows the embodiment that AP1 and STA1 are belonged to a single BSS, AP2 and STA2 are belonged to another BSS, and AP2 performs the dynamic CCA. In FIG. 17, types of signals (DATA or ACK) transmitted and received by STAs are shown as an example, and the embodiment below may be applied regardless of the types of signals. In the case that a type of a signal is DATA, the signal may include a data frame except ACK, a measurement frame, a management frame or a control frame including RTS/CTS frame, and in the case that a type of a signal is ACK, the signal may include an ACK frame, a block ACK frame or a multiplexed ACK frame.

When AP1 transmits a data to STA1, STA1 notifies that the data transmitted by AP1 is successfully received by transmitting ACK after an SIFS time. In such a case, in order to improve the spatial usability, in the duration in which AP1 transmits a data or in the duration in which STA1 transmits ACK, AP2 should be able to transmit the DATA or ACK to STA2. However, in the case that the signal transmitted by AP1 or STA1 is received with a CCA level or greater to STA2, AP2 determines the channel to be busy and does not transmit DATA/ACK.

In the case that AP2 transmits a signal (DATA/ACK) to STA2 by adjusting a CCA level upwardly in order to solve it, the signal transmitted by AP2 exerts as interference on AP1 or STA1, and accordingly, the communication performance may be degraded. That is, in the case that a specific STA such as AP2 transmits a signal selfishly in order to improve the spatial reuse performance, the performance of neighboring AP1 and STA1 is degraded, and also a problem may occur even in other devices that do not consider the spatial usability. Accordingly, the present invention proposes a method for adjusting a CCA level of an STA by considering transmission and reception states of neighboring STAs as well as the spatial usability.

In the embodiment below, the duration in which AP2 transmits DATA or ACK applying the dynamic CCA may be applied as follows. First, using PPDU length information transmitted to an SIG field or a MAC header, in the duration in which AP1 transmit data to STA1, AP2 may transmit DATA and ACK by applying the dynamic CCA. Alternatively, by using TXOP duration information transmitted to an SIG field or a MAC header, during the TXOP duration in which AP1 transmits DATA to STA1 and STA1 transmits ACK to AP1, AP2 may transmit DATA or ACK by applying the dynamic CCA. Furthermore, the present invention proposes a method of applying the dynamic CCA in DATA transmission duration rather than ACK transmission duration. This is because the merit of the spatial reuse becomes greater since the DATA transmission duration is longer than the ACK transmission duration, generally. However, according to an embodiment, based on a transmission frame type of an AP, the dynamic CCA may be applied in the transmission duration of ACK.

The information required for transmitting a signal by performing the dynamic CCA while AP2 does not degrade the link quality of STA1 is the required Signal to Interference-plus-Noise Ratio (SINR) of an MCS level constructing a signal frame received by STA1 or the SINR for the Signal to Noise Ratio (SNR), or difference of SNR. For example, in the case that STA1 receives a signal in MCS (#n) and in the case that the minimum required SINR or SNR for reconstructing a signal in the MCS level is x dB and the SINR or SNR of the signal that STA1 actually receives is y dB, STA1 has a margin with respect to interference as much as (y−x) dB.

In the present specification, the margin with respect to interference as such is referred to as Endurable Interference Margin (EIM), and the unit of the EIM may be represented as dB. The EIM represents the amount of interference that an STA is additionally allowable with respect to the current MCS level. The EIM may also be represented as dBm unit, and in this case, an STA may calculate the EIM of dBm unit by using at least one of Received Signal Strength Indication (RSSI) information and Received Channel Power Indicator (RCPI) information. The RSSI and the RCPI are the reception power (dBm) in which all of a target signal, interference and noise are combined. Accordingly, by converting the SINR of a received signal as a dBm value, the EIM may be converted as a dBm value.

As an embodiment, in the case that the RSSI is 0 dBm (1 mW), the SINR of a received signal is 3 dB and a required SINR is 0 dBm, the reception signal power may be ⅔ mW and the summation of reception interference and noise power may be ⅓ mW. In this case, since the reception signal power is a fixed value unless AP1 transmits it with greater power, the required signal power of the required SINR may be calculated as ⅔ mW, and the interference+noise power for the SINR to satisfy 0 dBm may be calculated as ⅔ mW. Accordingly, the EIM value in the embodiment may be ⅔ mW−⅓ mW=⅓ mW. Hereinafter, in the present specification, the EIM value may be described in a unit of absolute power.

In FIG. 17, in the case that the signal transmitted by AP2 exerts as interference smaller than the EIM of an STA, AP2 may transmit DATA or ACK even in the duration in which STA1 transmits and receives a signal. In order to perform such a dynamic CCA, an STA should transmit the EIM information and the transmission power information described above to an STA of other BSS. In the specification below, the parameter information transmitted to apply the dynamic CCA may be transmitted using a physical header or a MAC header of a signal.

1. Endurable Interference Margin (EIM) Information

An STA may notify the margin with respect to its own interference by transmitting the calculated EIM information to neighboring STAs. As a method of transmitting the EIM, a physical preamble or a MAC header may be used. In the case that an STA transmits the EIM using a physical header, there is an advantage that neighboring STAs may obtain the EIM information quickly, but the overhead is increased in the physical header in which resource is limited. The physical header is a physical preamble, and may include an HE-STF, an HE-LTF, and an HE-SIG field. Accordingly, the EIM information may not be transmitted with being included in the physical header, but also be transmitted with being included in a MAC header of MAC layer. As an embodiment, in the case that the EIM information is included in the physical header, the EIM information may be included in an SIG-A field of the physical header.

The EIM may be represented as A dBm value, and the A value may be belonged to the range of a≤λ≤b. In order to transmit A which is an EIM value, it should be transmitted after quantization is performed, and a step size regarding 'a' value, 'b' value and how many steps are present between 'a' and 'b' may be defined as the preconfigured values as a system parameter. As an embodiment, in the case that 'a' value is defined as −12 dBm, 'b' value is defined as −6 dBm and the step size is defined as 2 dB, the EIM value may have one value of {−12, −10, −8, −6}, and since the total number is 4, it may be signaled using 2 bits. In order to use such a transmission method, an STA may map the calculated EIM value to an integer through round-off, round-up, round-down, and the like of decimal units before transmitting the signal and may transmit the mapped integer value.

2. Transmission Power (Tx Power) Information

An AP/STA may transmit the information of a transmission power of a signal transmitted by itself, that is, the information of dB that the STA is transmitting currently to a neighboring STA.

As a method of transmitting the transmission power information, a physical preamble or a MAC header may be used. In the case that an STA transmits the transmission power information using a physical header, there is an advantage that neighboring STAs may obtain the transmission power information quickly, but the overhead is increased in the physical header in which resource is limited. The physical header is a physical preamble, and may include an HE-STF, an HE-LTF, and an HE-SIG field. Accordingly, the transmission power information may not be transmitted with being included in the physical header, but may also be transmitted with being included in a MAC header of MAC layer. As an embodiment, in the case that the transmission power information is included in the physical header, the transmission power information may be included in an SIG-A field of the physical header.

The transmission power information may be represented as τ dBm value, and the T value may be belonged to the range of p≤τ≤q. In order to transmit T which is a transmission power value, it should be transmitted after quantization is performed, and a step size regarding 'p' value, 'q' value and how many steps are present between 'p' and 'q' may be defined as the preconfigured values as a system parameter. As an embodiment, in the case that 'p' value is defined as −5 dBm, 'q' value is defined as 30 dBm and the step size is defined as 5 dB, the transmission power value may have one value of {−5, 0, 5, 10, 15, 20, 25, 30}, and since the total number is 8, it may be signaled using 3 bits. In order to use such a transmission method, an STA may represent the calculated transmission power value as an integer through round-off, round-up, round-down, and the like of decimal units before transmitting the signal, and may map it to a closest integer value, and may transmit the mapped integer value.

As described above, the STA that receives the transmitted transmission power information may calculate the path-loss (dB) using the difference between the power of the received signal and the transmission power (Path-loss=function {Tx power−Received power}). The STA may calculate the reception power using a parameter such as the RSSI or the RCPI, or may calculate more accurate reception power using the SNR of the received signal.

Meanwhile, in the case that distances of a transmitter and a receiver are known, more accurate path-loss may be calculated. According to a system environment, as a mathematical expression of calculating a path-loss, the following equations may be used. However, it is one of the embodiments for calculating the path-loss, and the path-loss may be calculated using an Equation or a coefficient proper to a system characteristic.

Equation 1 is an equation for calculating a path-loss, and L(d) value represents a path-loss (dB) value according to a distance. In this case, A, B and C values may have different values depending on a radio channel environment. Equation 2 corresponds to Small and medium cities environments, Equation 3 corresponds to metropolitan area environments, Equation 4 corresponds to suburban environments, and Equation 5 corresponds to Rural areas environments, which correspond to Equations for setting different A, B and C values for considering each environment. d denotes a distance of km unit, fc denotes a center frequency, hd denotes an antenna height of a user equipment which is transmitting, and hm denotes an antenna height of a user equipment which is receiving.

$$\begin{cases} L(d) = A + B\log_{10}(d) + C \\ A = 46.3 + 33.9\log_{10}(f_c) - 13.82(h_b) - a(h_m) \\ B = 44.9 - 6.55\log_{10}(h_b) \end{cases} \quad [\text{Equation 1}]$$

$$a(h_m) = (1.11\log_{10}(f_c) - 0.7)h_m - (1.56\log_{10}(f_c) - 0.8) \quad [\text{Equation 2}]$$
$$C = 0$$

$$a(h_m) = \begin{cases} 8.29(\log_{10}(1.54h_m)^2) - 1.1 & \text{for } f \le 200 \text{ MHz} \\ 3.2(\log_{10}(11.75h_m)^2) - 4.97 & \text{for } f \ge 400 \text{ MHz} \end{cases} \quad [\text{Equation 3}]$$
$$C = 0$$

$$a(h_m) = (1.11\log_{10}(f_c) - 0.7)h_m - (1.56\log_{10}(f_c) - 0.8) \quad [\text{Equation 4}]$$
$$C = -2[\log_{10}(f_c/28)]^2 - 5.4$$

$$a(h_m) = (1.11\log_{10}(f_c) - 0.7)h_m - (1.56\log_{10}(f_c) - 0.8) \quad [\text{Equation 5}]$$
$$C = -4.78[\log_{10}(f_c)]^2 - 18.33\log_{10}(f_c) - 40.98$$

As described above, an STA that is going to perform the dynamic CCA may calculate the path-loss between a neighboring STA which is currently transmitting and receiving and the STA itself, and accordingly, may predict the amount of interference that the STA itself influences on the neighboring STA. In the present specification, the mount of interference exerted on the neighboring STA is defined as a Predicted Interference Power (PIP), and as a unit dBm is used. As an embodiment, since the STA knows its own transmission power (dBm) and the path-loss (dB) between the neighboring STA which is currently transmitting and receiving and the STA itself, the STA may calculate the PIP (dBm) (PIP=Tx power(AP2)−Path Loss).

As another embodiment, AP2 may receive the EIM information and the transmission power information from AP1, not STA1. This is because the duration in which AP2 transmits data/ACK signal to STA2 by applying the dynamic CCA may be performed with the duration in which AP1 transmits it to STA1 as its starting point. In other words, when the dynamic CCA is performed based on a signal transmission starting point of AP1, the spatial reuse duration may be increased. In this case, in comparison with the case that the dynamic CCA is performed based on the signal transmitted by an STA, the spatial reuse is available for longer duration.

As described above, the EIM information may be included in a control frame. Accordingly, the EIM information may be transmitted with being included in a Request To Send (RTS) frame or a Clear To Send (CTS) frame. The EIM information may be transmitted with being included in a physical header/preamble or a MAC header.

In such a case, AP1 should perform a calculation for the EIM, and for this, AP1 should know the information of the SINR, the RSSI with respect to the signal received by STA1 and the required SINR with respect to the corresponding MCS level. Since the required SINR with respect to the MCS level is the information of the signal that AP1 transmits to STA1, an additional information exchange for obtaining it is not required. However, the SINR information and the RSSI information with respect to the signal received by STA1 should be obtained from an STA by communicating it in advance. In an embodiment of the present invention, an AP may obtain at least one of the SINR information and the RSSI information of the STA through the Channel State Information (CSI) feedback. As an embodiment, a CSI frame including the CSI feedback may further include at least one of the SINR information and the RSSI information of the STA.

As an embodiment, in the case that AP1 and STA1 are closely located and i) the interference and the channel state are similar and ii) the path-loss between AP1 and AP2 and the path-loss between STA1 and STA2 are similar, AP1 may also be infer the SINR and the RSSI of the signal received by STA1. Accordingly, in such a case, AP1 may transmit the EIM information in behalf of STA1, and AP2 may perform the dynamic CCA using it. As another embodiment, in the case that the distance between AP1 and STA1 is away by a predetermined distance or AP1 is unable to obtain accurate CSI information from STA1, the EIM value transmitted by AP1 may be different from an actual EIM value. Accordingly, depending on the distance from STA1 or interference environment, AP1 may transmit the information on whether the EIM information transmitted by AP1 is used as the EIM information of STA1 together with the EIM information.

Depending on the distance from STA1 or interference environment, AP1 may transmit the information on whether the EIM information by AP1 is used as the EIM information of STA1, and this information may be referred to as close link information. The close link information may represent whether the distance between AP1 and STA1 is close more than a predetermined reference. Alternatively, the close link information may represent the similarity of the channel between AP1 and STA1 or the similarity of (channel) interference environment, or represent whether the similarity is a predetermined threshold or more/under. The close link information may be included in a physical preamble or a MAC header of a transmission signal. In the case of the physical preamble, the close link information may be included in SIG-A/B/C field.

As an embodiment, the close link information may be signaled as 1 bit. When a bit value of the close link information is 0, it represents that it is a close link, and when a bit value of the close link information is 1, it represents that it is far link. In addition, in the present invention, in the case that a distance between AP1 and STA1 is far, STA1 may be more sensitive to interference around. Accordingly, this field may be used as a command not to perform the dynamic CCA to neighboring STA (AP-STA and non-AP STA) in the case that a distance between AP1 and STA1 is far. In such a case, the close link information may be used as dynamic CCA enable information/field.

As an embodiment, when the close link information is 0, AP2 may use the EIM information received from AP1 for the dynamic CCA performance when transmitting a signal with respect to STA1. When the close link information is 1, AP2 may use the EIM information received from AP1 for the dynamic CCA performance when transmitting a signal with respect to AP1. In the case that a value of the close link information is 0, the EIM information received from AP1 may correspond to the EIM information with respect to STA1, and in the case that a value of the close link information is 1, the EIM information received from AP1 may correspond to the EIM information with respect to AP1.

As another embodiment, AP1 may transmit a distance between AP1 and STA1, path-loss or the information of the RSSI as an additional restriction value for the transmitted EIM information. As an embodiment, AP1 may transmit at least one of the path-loss information according to a distance from STA1 or the RSSI information between AP1 and STA1 with being inserted in SIG-A/B/C field of a transmission signal. AP2 that overhears such information may perform the dynamic CCA by considering the additional restriction value additionally. Such additional restriction information may be signaled by setting a step in the additional restriction value. As an embodiment, the additional restriction information may be transmitted with 1 bit or 2 bits.

$$\text{Pathloss} = 10\log_{10}\left(\left(\frac{4\pi df}{c}\right)^2\right) \qquad \text{[Equation 6]}$$
$$= 20\log_{10}(d) + 20\log_{10}(f) + 20\log_{10}\left(\frac{4\pi}{c}\right)$$
$$= 20\log_{10}(d) + 20\log_{10}(f) - 147.55$$

Equation 6 represents an embodiment of calculating a path-loss in Free Space situation.

TABLE 3

| Additional restriction | Path-loss | Value |
|---|---|---|
| 00 | Path-loss < 66.4 dB (within 10 ms) | EIM-0 dB |
| 01 | 66.4 dB <= Path-loss < 75.9 dB (within 30 m) | EIM-3 dB |
| 10 | 75.9 dB <= Path-loss < 80.3 dB (within 30 m) | EIM-6 dB |
| 11 | 80.3 dB <= Path-loss (50 or more) | EIM-9 dB |

Table 3 represents an embodiment in the case that a field transferring the additional restriction information is set to 2 bits. As represented in Table 3, each field value represents additional path-loss according to distance between AP1 and STA1/channel environment. As represented in Table 3, the additional restriction information may also directly represent differenced EIM value. After applying the EIM value in which the received additional restriction information is represented to the EIM value received from AP1, AP2 may perform the dynamic CCA. As another embodiment, AP1 may subtract the additional restriction value from the EIM value by applying the distance from STA1, and may transmit the final EIM value with being included in SIG-A/B/C field directly. In such a case, it may not be required to signal the additional restriction information additionally described above.

Finally, an STA may perform the dynamic CCA by comparing the EIM received from neighboring AP/STAs with an amount of interference (PIP) caused by the STA itself. In the embodiment described above, AP2 may perform the dynamic CCA by using the EIM related information received from AP1. The detailed method of performing the dynamic CCA based on the EIM and the PIP is as below. The STA that performs the dynamic CCA may change CCA-SD level or change a transmission power through the operation below. The additional restriction value may be considered or may not be considered depending on a distance between AP1 and STA1 or the similarity of interference environment.

$$EIM > PIP(+\text{Additional restriction}) \quad (1)$$

As a result of comparing the received EIM value with the PIP value, in the case that the EIM value is greater than the PIP value, an STA may increase the current CCA-SD level as much as +n dB. According to an embodiment, the increment (n value) of the CCA level may use a fixed value or a changeable value depending on the comparison result of EIM-PIP. The increased CCA level may be restricted to the maximum value. As an embodiment, the maximum CCA level may be restricted to the threshold of the CCA-ED according to the corresponding bandwidth.

As another embodiment, as a result of comparing the received EIM value with the PIP value, in the case that the EIM value is greater than the PIP value, AP2 may immediately change the CCA-SD level to the threshold of the CCA-ED that corresponds to the corresponding bandwidth. This is because the case is a case that AP2 may perform the dynamic CCA transmission within the range in which STA1 does not influence on a link quality.

$$EIM < PIP(+\text{Additional restriction}) \quad (2)$$

As a result of comparing the received EIM value with the PIP value, in the case that the EIM value is smaller than the PIP value, an STA may maintain the current CCA level or decrease it as much as m dB.

As an embodiment, as the case that the receive EIM value is smaller than the PIP value, in the case that the current CCA-SD level is the same as the CCA-SD level minimum value with respect to the corresponding bandwidth, an STA may maintain the current CCA-SD value. In this case, the minimum value of the CCA-SD level may be the same as the CCA-SD level value of a legacy AP STA/non-AP STA with respect to the corresponding bandwidth.

As an embodiment, as the case that the receive EIM value is smaller than the PIP value, in the case that the current CCA-SD level is not the same as the CCA-SD level minimum value with respect to the corresponding bandwidth, an STA may decrease the current CCA-SD level as much as m dB, or may change it to the CCA-SD level minimum value directly. In this case, the minimum value of the CCA-SD level may be restricted as the CCA-SD value of a legacy AP STA/non-AP STA.

As another embodiment, the transmission power of AP2 may be adjusted such that the condition EIM>PIP (+Additional restriction) is satisfied. By decreasing the transmission power, an STA may decrease the PIP value. Accordingly, in order to satisfy the condition EIM>PIP (+Additional restriction), AP2 may decrease the transmission power and perform the dynamic CCA. In this case, in the case of being transmitted to STA2 with a specific MCS level, the minimum value of the transmission power becomes a value that may satisfy the required SINR of the specific MCS level. The MCS level may have a value in the range of 0 to 10.

$$EIM = PIP(+\text{Additional restriction}) \quad (3)$$

As a result of comparing the received EIM value with the PIP value, in the case that the EIM value is the same as the PIP value, an STA may maintain the CCA level. However, as an embodiment, depending on a system situation and a communication environment of the STA, the CCA level may be increased or decreased as described above. That is, depending on a system situation, the operation corresponding to case (1) and case (2) described above may be selectively performed.

Hereinafter, the dynamic CCA performing method according to applying beamforming, MIMO and OFDMA is described.

First, the case that the MIMO technique is applied and the beamforming is applied is described.

For the CCA level adjustment, in the case that the MIMO technique is applied and the beamforming technique is used, AP1 transmits a signal by performing precoding in the transmission signal, and STA1 performs receiving beamforming, thereby reception performance being improved. Particularly, in the case that STA1 performs the receiving beamforming, an interference signal in addition to the signal received from AP1 may be mitigated, and accordingly, the OBSS AP/STAs like AP2 may perform the dynamic CCA more efficiently. For example, in the case that AP1 identifies that an STA performs the receiving beamforming or the channel state of an STA is very good through feedback information, AP1 may instruct a neighboring OBSS AP/STA to perform the dynamic CCA transmission, and such information may also be the dynamic CCA enable information described above. When transmitting the EIM information, AP1 may transmit an EIM value considering the gain due to the receiving beamforming.

Otherwise, AP1 may also transmit a signal using the beamforming technique. AP1 and STA1 may calculate the beam pattern or the beam index in which the SINR becomes maximized. In addition, AP2 and STA2 of the OBSS may also calculate the beam pattern or the beam index in which the SINR becomes maximized. Accordingly, in the case that each of the APs transmits a signal by using the analyzed beam pattern, each of the APs may transmit the information of at least one beam pattern by considering the beam pattern with respect to the signal received from its own STA. The information of at least one beam pattern, that is, the information of a beam pattern set may be transmitted through an SIG-A/B/C field or a MAC header of the transmission signal. The beam pattern may be transmitted via a common signal so as to be commonly applied to an STA of an AP or may be transmitted with STA-specific manner so as to be independently applied.

Alternatively, an AP may calculate the information (beam pattern set) for at least one beam pattern that may minimize or decrease the influence on an STA communicating with, and may transmit the information of beam patterns through an SIG-A/B/C field or a MAC header of the transmission signal. In this case, the beam pattern may be transmitted via a common signal so as to be commonly applied to an STA that the AP communicates with or may be transmitted with STA-specific manner so as to be independently applied. The neighboring STAs of the OBSS that overhear the transmission signal of the AP may minimize interference by performing beamforming using such information, and accordingly, may increase the spatial reuse opportunity and efficiency.

Hereinafter, the dynamic CCA performing method described above according to the use of the OFDMA and the MU-MIMO is described. Hereinafter, the case of applying the OFDMA is described separately with respect to the case of applying the MU-MIMO. However, since the OFDMA and the MU-MIMO may be used at the same time, the description for each case may be applied with being combined.

In the HE system, the OFDMA scheme may be used in order to transmit and receive more signals to a plurality of STAs simultaneously. The Orthogonal Frequency Division Multiple Access (OFDMA) is a multi-user version of the OFDM digital modulation scheme. The OFDMA scheme represents a scheme that each of a plurality of users is allocated with and uses a subset of a subcarrier, not a scheme that a user monopolizes the multiple carriers according to the OFDM scheme, that is, a subcarrier. The subcarrier used in the OFDMA, that is, a subcarrier may be referred to as a tone, and such tones may be allocated to each user as a unit of subblock according to a tone plan. In the case that the OFDMA is applied, an STA may transmit data by allocating a transmission signal to a user in a unit of resource unit. As an embodiment, an STA may allocate a bandwidth in a unit of resource unit (e.g., 26 tones, 52 tones, 106 tones, 242 tones, etc.) including a specific number of tones and may transmit a signal to a plurality of users simultaneously.

In the case of using the OFDMA, an STA may transmit the EIM information for a plurality of STAs. In the case that the OFDMA is applied and the scheduling information (signaling information for each STA) for each of the STAs is transmitted using an SIG-A/B/C field, the EIM information for each STA may be transmitted. The EIM information is information which is commonly applied to all STAs and may be transmitted with being included in a part of an SIG-A field or an SIG-B field. Alternatively, the EIM information is information which is independently applied to each of the STAs and may be transmitted with being included in a part of an SIG-A field or an SIG-B field or in a part of an SIG-B field and an SIG-C field, or in an SIG-C field. The EIM information may be transmitted with being included in at least one field of SIG-A/B/C fields.

As an embodiment, an AP may transmit the EIM information of a representative STA that is the most sensitive to interference. Such representative EIM value may be transmitted with being included in a signaling field that is applied to all STAs. Alternatively, an AP may transmit an average EIM value with respect to each STA as common control information, and may transmit the difference values with respect to the average EIM value of each STA as independent control information. As an embodiment, an STA may transmit the average EIM value or the representative EIM value through SIG-A/B/C fields through which the common control information is transmitted, and may transmit the difference value with respect to each of the STAs through SIG-A/B/C fields through which the independent control information is transmitted.

Since STAs are allocated for each frequency based on the OFDMA, the EIM information may be transmitted with a unit of frequency bandwidth, not a unit of STA as described above. As an embodiment, an STA may transmit the common control information for the corresponding system bandwidth with a unit of system bandwidth, and may transmit the subcarrier allocation for STAs in the system bandwidth as STA-specific information. When transmitting the OFDMA, the STA may transmit the EIM information with respect to at least one subcarrier set. The EIM information is information commonly applied to all subcarriers, and may be transmitted with being included in a part of an SIG-A field or an SIG-B field. Alternatively, the EIM information is information which is independently applied to each of the subcarrier sets and may be transmitted with being included in a part of an SIG-A field or an SIG-B field or in a part of an SIG-B field and an SIG-C field, or in an SIG-C field. The EIM information may be transmitted with being included in at least one field of SIG-A/B/C fields.

As an embodiment, an AP may transmit the EIM information of a representative subcarrier set that is the most sensitive to interference. Such representative EIM value may be transmitted with being included in a signaling field that is applied to all subcarrier sets. Alternatively, an AP may transmit an average EIM value with respect to each subcarrier set as common control information, and may transmit the difference values with respect to the average EIM value of each subcarrier set as independent control information. As an embodiment, an STA may transmit the average EIM value or the representative EIM value through SIG-A/B/C fields through which the common control information is transmitted, and may transmit the difference value with respect to each subcarrier set through SIG-A/B/C fields through which the independent control information is transmitted. Even in a system that supports a wideband, an STA may transmit the EIM information in a unit of subcarrier set. However, considering the signaling overhead, the STA may transmit the EIM information in a unit of 20 MHz (or, 242 subcarrier sets or 26 subcarrier sets). The subcarrier set represents the resource unit in a unit of tone described above.

As another embodiment, in order to decrease the signaling overhead and the system complexity, instead of transmitting the EIM information in a unit of bandwidth or resource unit, an STA may directly indicate the information of spatial reuse possibility. For example, an STA may indicate the information of spatial reuse possibility to a neighboring OBSS STA in a unit of 20 MHz or resource unit by using 1 bit or more than 1 bit. The STA may transmit the information of interference sensitivity in a unit of 20 MHz or resource unit within a system bandwidth, and the OBSS STAs that receive it may perform the dynamic CCA or the spatial reuse transmission a unit of 20 MHz or resource unit.

TABLE 4

| System bandwidth | Subcarrier set | Interference sensitivity | Value |
| --- | --- | --- | --- |
| 80 MHz | 20 MHz (#1) | 00 | High |
|  | 20 MHz (#2) | 11 | Low |
|  | 20 MHz (#3) | 01 | Medium |
|  | 20 MHz (#4) | 11 | Low |

Table 4 is an embodiment of transmitting the information of interference sensitivity in a unit of 20 MHz (242 tones) within the system bandwidth of 80 MHz by distinguishing it into 3 states and using 2 bits. In Table 4, 80 MHz bandwidth is divided into #1 to #4 20 MHz sub bandwidth. And, an AP may transmit the information of interference sensitivity for each sub bandwidth using 2 bits. The STA of the OBSS that receives the information of interference sensitivity as represented in Table 4 may perform the spatial reuse transmission only in the sub bandwidth (#2 and #4) in which the interference sensitivity is low.

In the case of using the MU-MIMO, an STA may transmit the EIM information for a plurality of STAs. In the case that the MU-MIMO is applied and the scheduling information (signaling information for each STA) for each of the STAs is transmitted using an SIG-A/B/C field, the EIM information for each STA may be transmitted. The EIM information is information which is commonly applied to all STAs and may be transmitted with being included in a part of an SIG-A field or an SIG-B field. Alternatively, the EIM information is information which is independently applied to each of the STAs and may be transmitted with being included in a part of an SIG-A field or an SIG-B field or in a part of an SIG-B field and an SIG-C field, or in an SIG-C field. The EIM information may be transmitted with being included in at least one field of SIG-A/B/C fields.

As an embodiment, an AP may transmit the EIM information of a representative STA that is the most sensitive to interference. Such representative EIM value may be transmitted with being included in a signaling field that is applied to all STAs. Alternatively, an AP may transmit an average EIM value with respect to each STA as common control information, and may transmit the difference values with respect to the average EIM value of each STA as independent control information. As an embodiment, an STA may transmit the average EIM value or the representative EIM value through SIG-A/B/C fields through which the common control information is transmitted, and may transmit the difference value with respect to each of the STAs through SIG-A/B/C fields through which the independent control information is transmitted.

FIG. 18 shows an STA device according to an embodiment of the present invention.

In FIG. 18, the STA device may include memory 18010, a processor 18020 and an RF unit 18030. Furthermore, as described above, the STA device is a HE STA device, and an AP or non-AP STA may become the STA device.

The RF unit 18030 is connected to the processor 18020 and may send/receive a radio signal. The RF unit 18030 may up-convert data received from the processor into a transmission/reception band, and may send a corresponding signal.

The processor 18020 is connected to the RF unit 18030 and may implement the PHY layer and/or the MAC layer according to the IEEE 802.11 system. The processor 18030 may be configured to perform operations according to various embodiments of the present invention according to the aforementioned drawing and description. Furthermore, a module for implementing the operation of an STA according to the aforementioned various embodiments of the present invention may be stored in the memory 18010 and executed by the processor 18020.

The memory 18010 is connected to the processor 18020 and stores various pieces of information for driving the processor 18020. The memory 18010 may be included within the processor 18020 or disposed outside the processor 18020 and may be connected to the processor 18020 by known means.

Furthermore, the STA device may include a single antenna or multiple antennas. A detailed configuration of the STA device of FIG. 18 may be implemented so that the contents described in the aforementioned various embodiments of the present invention are independently applied or two or more of the aforementioned various embodiments are applied to the detailed configuration as the same time.

A method for adjusting/performing CCA by the STA device of FIG. 18 and a corresponding data transmission are described along with the following flowchart.

FIG. 19 shows a method for sending, by a station (STA), data according to an embodiment of the present invention.

An STA may receive a signal from a first STA of other BSS (step, S19010). As an embodiment, the BSS to which the STA is belonged and a first BSS to which the first STA is belonged may be the OBSS. The reception signal may not be the signal that the first STA transmits by targeting the STA, but may be the signal that the first STA transmits to other STAs of the first BSS to which the first STA is belonged.

The STA may obtain the EIM information and the transmission power information from the reception signal (step, S19020). As described above, the EIM information indicates an amount of the interference margin allowable by the first STA, and the transmission power information indicates the transmission power of the first STA. And, the EIM information and the transmission power information may be included in a physical header or a MAC header. In the case of being included in a physical header, the EIM information and the transmission power information may also be included in an SIG-A field.

The STA may obtain the PIP by using the transmission power information (step, S19030). As described above, the PIP may indicate an amount of the interference exerted to the first STA when the STA transmits a signal. The method for the STA to obtain the PIP is as described above. That is, the STA may obtain the path-loss between the STA and the first STA by using the transmission power of the first STA and the power of the signal received from the first STA. In addition, the STA may obtain the PIP by using the obtained path-loss and the transmission power of the STA.

The STA may adjust the CCA level or the transmission power based on the EIM and the PIP (step, S19040). The method of adjusting the CCA level and the transmission power of the STA are as described above. Roughly describing, when the EIM is greater than the PIP, the STA may increase the CCA level, and when the EIM is smaller than the PIP, the STA may maintain or decrease the CCA level. In addition, the STA may increase the transmission power when the EIM is greater than the PIP, or may decrease the transmission power when the EIM is smaller than the PIP. The adjusted CCA level may be adjusted between the minimum value and the maximum value as described above.

In addition, the STA may perform the CCA according to the adjusted CCA level, and may initiate a signal transmission according to the result of the comparison of the reception signal strength with the CCA level. In the case that the transmission power is adjusted instead of the adjustment of the CCA level, the STA may perform the CCA according to a predefined CCA level, may initiate a signal transmission according to the result of the comparison of the reception signal strength with the CCA level, and may transmit the power of the transmission signal by adjusting it as described above.

As a result of performing the CCA, in the case that the reception signal strength is the adjusted the CCA level or greater, the STA may detect a corresponding wireless medium as the busy condition, and in the case that the reception signal strength is smaller than the adjusted the CCA level, the STA may detect a corresponding wireless medium as the idle condition. Furthermore, in the case that the wireless medium is in the idle condition, the STA may initiate the data transmission. Here, the initiation of the data transmission may further include steps of transmitting an RTS frame and transmitting data after receiving a CTS frame as well as the simple data transmission as described above.

FIG. 20 illustrates a data transmission method performed by an STA device according to an additional embodiment of the present invention.

Particularly, FIG. 20 shows the case that a reception signal of an STA is transmitted by an AP. The description for the method of FIG. 19 may be applied to the method of FIG. 20, and the overlapped description may be briefly described or omitted.

The STA may receive a signal for a first STA of other BSS from a first AP of other BSS (step, S20010). As an embodiment, the BSS to which the STA is belonged and a first BSS to which the first STA is belonged may be the OBSS. That is, the STA may overhear the signal that the first AP of OBSS transmits to the first STA of the OBSS.

The STA may obtain the EIM information and the transmission power information from the reception signal (step, S20020). As described above, the EIM information indicates an amount of the interference margin allowable by the first AP or the first STA, and the transmission power information indicates the transmission power of the first AP. And, the EIM information and the transmission power information may be included in a physical header or a MAC header. In the case of being included in a physical header, the EIM information and the transmission power information may also be included in an SIG-A field.

The STA may obtain the PIP by using the transmission power information (step, S20030). As described above, the PIP may indicate an amount of the interference exerted to the first AP or the first STA when the STA transmits a signal. The method for the STA to obtain the PIP is as described above. However, the reception signal may include proximity link information that indicates the similarity of the interference environment between the first AP and the first STA. The proximity link information may also represent a distance between the first AP and the first STA or represent on whether the distance is a preconfigured reference or shorter/ shorter than a preconfigured reference. Furthermore, the STA may determine whether to apply the EIM information to the first STA based on the proximity link information.

The EIM information may include at least one of the EIM information of the first AP or the EIM information of the first STA, and the STA may use the EIM information received from AP1 for performing the dynamic CCA with respect to STA1 based on the proximity link information. In this case, the reception signal may further include the correction value of the EIM information based on the path-loss between AP1 and STA1, that is, the additional restriction information of Table 3.

The STA may adjust the CCA level or the transmission power based on the EIM and the PIP (step, S20040). The method of adjusting the CCA level and the transmission power of the STA are as described above in FIG. 19.

In the method of FIG. 19 and FIG. 20, the reception signal may further include the beam pattern information applied by the STA when transmitting a signal according to the CCA level adjustment. As described above, the beam pattern information may represent a beam pattern set that may be reused when the spatial reuse transmission is performed, or may represent a beam pattern set that should be avoided when the spatial reuse transmission is performed.

Furthermore, in the method of FIG. 19 and FIG. 20, in the case that the OFDMA scheme is applied to the reception signal, the EIM information may indicate a single EIM value (representative value) with respect to a plurality of STAs or a plurality of sub bandwidths to which a resource unit of the reception signal is allocated or may indicate a plurality of EIM values. A plurality of the EIM values may represent the EIM value with respect to each STA/sub bandwidth or difference values with respect to a single representative value.

In addition, in the method of FIG. 19 and FIG. 20, in the case that the OFDMA scheme is applied to the reception signal, the reception signal may include the interference sensitivity information (Table 4) with respect to a plurality of sub bandwidths to which a resource unit is allocated.

Those skilled in the art will understand that the present invention may be changed or modified in various ways without departing from the spirit or range of the present invention. Accordingly, the present invention has been intended to include the changes and modifications of the present invention provided within the claims and equivalents thereof.

In this specification, both the apparatus and method inventions have been described and the descriptions of both the apparatus and method inventions may be supplemented and applied.

MODE FOR INVENTION

The various embodiments have been described in the best mode for implementing the present invention.

INDUSTRIAL APPLICABILITY

The method of transmitting and receive data in the wireless communication system of the present invention has been illustrated as being applied to the IEEE 802.11 system, but may be applied to various wireless communication systems in addition to the IEEE 802.11 system.

The invention claimed is:

1. A method for transmitting data performed by a station (STA) in a Wireless LAN (WLAN) system, comprising:
   receiving a signal from a first STA via a first AP of a first Basic Service Set (BSS) which is a different BSS from a second BSS to which the STA belongs,
   wherein the received signal comprises Endurable Interference Margin (EIM) information and transmission power information, the EIM information being obtained by using an allowed error margin for a certain modulation and coding rate and received power measured by the first STA, the transmission power information related to a transmission power of the first STA, and proximity link information related to similarity of interference environment between the first AP and the first STA;
   determining whether to apply the EIM information to the first STA based on the proximity link information;
   determining whether to perform dynamic Clear Channel Assessment (CCA) based on the EIM information of the first STA, the transmission power information of the first STA, transmission power of the STA, and received power of the first STA according to the determination using the proximity link information; and controlling a CCA level or a transmission power by the determination.

2. The method for transmitting data performed by an STA of claim 1, wherein a HE-SIG-A field of the received signal includes CCA enable information which is related to whether to perform the dynamic CCA or not.

3. The method for transmitting data performed by an STA of claim 1, wherein the EIM information includes at least one of EIM information for the first AP or EIM information for the first STA.

4. The method for transmitting data performed by an STA of claim 2, wherein the received signal includes additional restriction information related to a correction value of the EIM information based on a path-loss between the first AP or the first STA.

5. The method for transmitting data performed by an STA of claim 1, wherein the received signal further includes beam pattern information applied by the STA when transmitting a signal according to the CCA level adjustment.

6. The method for transmitting data performed by an STA of claim 1, wherein when the received signal is a signal to which Orthogonal Frequency Division Multiple Access (OFDMA) scheme is applied, the EIM information is related to a single EIM value with respect to a plurality of STAs or a plurality of sub bandwidths to which a resource unit of the reception signal is allocated or related to a plurality of EIM values.

7. The method for transmitting data performed by an STA of claim 1, wherein when the received signal is a signal to which Orthogonal Frequency Division Multiple Access (OFDMA) scheme is applied, the reception signal includes interference sensitivity information with respect to a plurality of sub bandwidths to which a resource unit is allocated.

8. The method for transmitting data performed by an STA of claim 1, wherein the first BSS is an Overlapping Basic Service Set (OBSS) with respect to the second BSS.

9. A station (STA) device of a wireless LAN (WLAN) system, the STA device comprising:

a radio frequency (RF) transceiver configured to transmit and receive a radio signal; and a processor configured to control the RF transceiver, wherein the STA device:

receives a signal from a first STA via a first AP of a first Basic Service Set (BSS) which is a different BSS from a second BSS to which the STA device belongs, wherein the received signal comprises Endurable Interference Margin (EIM) information and transmission power information, the EIM information being obtained by using an allowed error margin for a certain modulation and coding rate and received power measured by the first STA, the transmission power information related to a transmission power of the first STA, and proximity link information related to similarity of interference environment between the first AP and the first STA;

determines whether to apply the EIM information to the first STA based on the proximity link information;

determines whether to perform dynamic Clear Channel Assessment (CCA) based on Endurable Interference Margin (EIM) information of the first STA, transmission power information of the first STA, transmission power of the STA, and received power of the first STA according to the determination using the proximity link information; and controls a CCA level or a transmission power by the determination.

10. The STA device of claim 9, wherein a HE-SIG-A field of the received signal includes CCA enable information which is related to whether to perform the dynamic CCA or not.

11. The STA device of claim 9, wherein the EIM information includes at least one of EIM information for the first AP or EIM information for the first STA.

12. The STA device of claim 10, wherein the received signal includes additional restriction information related to a correction value of the EIM information based on a path-loss between the first AP or the first STA.

13. The STA device of claim 9, wherein the received signal further includes beam pattern information applied by the STA when transmitting a signal according to the CCA level adjustment.

14. The STA device of claim 9, wherein when the received signal is a signal to which Orthogonal Frequency Division Multiple Access (OFDMA) scheme is applied, the EIM information is related to a single EIM value with respect to a plurality of STAs or a plurality of sub bandwidths to which a resource unit of the reception signal is allocated or related to a plurality of EIM values.

15. The STA device of claim 9, wherein when the received signal is a signal to which Orthogonal Frequency Division Multiple Access (OFDMA) scheme is applied, the received signal includes interference sensitivity information with respect to a plurality of sub bandwidths to which a resource unit is allocated.

16. The STA device of claim 9, wherein the first BSS is an Overlapping Basic Service Set (OBSS) with respect to the second BSS.

* * * * *